(12) United States Patent
Lee et al.

(10) Patent No.: US 8,984,362 B2
(45) Date of Patent: Mar. 17, 2015

(54) MAC PDU SPLITTING BASED ON A SUBFRAME SIZE WITH CRC ADDED TO THE SPLIT UNIT

(75) Inventors: Eun Jong Lee, Anyang-si (KR); Min Seok Oh, Anyang-si (KR); Hyung Ho Park, Anyang-si (KR); Doo Hyun Sung, Anyang-si (KR); Jin Soo Choi, Anyang-si (KR); Han Gyu Cho, Anyang-si (KR); Jae Hoon Chung, Anyang-si (KR); Jong Young Han, Anyang-si (KR); Sung Ho Moon, Anyang-si (KR); Kyu Jin Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1158 days.

(21) Appl. No.: 12/677,172

(22) PCT Filed: Sep. 9, 2008

(86) PCT No.: PCT/KR2008/005315
§ 371 (c)(1),
(2), (4) Date: Dec. 10, 2010

(87) PCT Pub. No.: WO2009/035249
PCT Pub. Date: Mar. 19, 2009

(65) Prior Publication Data
US 2011/0126068 A1 May 26, 2011

Related U.S. Application Data

(60) Provisional application No. 60/982,731, filed on Oct. 26, 2007, provisional application No. 61/029,378, filed on Feb. 18, 2008, provisional application No. 61/045,614, filed on Apr. 17, 2008.

(30) Foreign Application Priority Data

Sep. 10, 2007 (KR) .................. 10-2007-0091729
Aug. 20, 2008 (KR) .................. 10-2008-0081596

(51) Int. Cl.
*G06F 11/10* (2006.01)
*H04L 1/00* (2006.01)
(Continued)

(52) U.S. Cl.
CPC ............ *H04L 1/1607* (2013.01); *H04L 1/1822* (2013.01); *H04L 1/1867* (2013.01); *H04L 5/0007* (2013.01); *H04L 5/0048* (2013.01); *H04W 28/06* (2013.01)
USPC ............................ 714/752; 714/746; 714/751

(58) Field of Classification Search
CPC .......................... H04B 7/0413; H04L 25/0204
USPC ............................ 714/46, 751, 748, 752, 761
See application file for complete search history.

(56) References Cited

U.S. PATENT DOCUMENTS 5,477,533 A * 12/1995 Tsurumaki .................... 370/294
5,594,732 A * 1/1997 Bell et al. ...................... 370/401
(Continued)

FOREIGN PATENT DOCUMENTS

KR 10-2006-0065790 A 6/2006

*Primary Examiner* — Joseph Schell
(74) *Attorney, Agent, or Firm* — McKenna Long & Aldridge LLP

(57) ABSTRACT

A method is described for transmitting signals in a mobile communication system which splits an information block into a plurality of split-information blocks and performs a hybrid automatic repeat request (HARQ) process upon each of the split-information blocks. A method is also described for reducing control information overhead by transmitting control information only through one control channel when splitting an information block and transmitting split-information blocks through a plurality of subframes or a plurality of resource blocks. The segmentation of the information block is performed in a physical layer to reduce medium access control (MAC) overhead and to simplify implementation.

8 Claims, 25 Drawing Sheets

(51) Int. Cl.
*H04L 1/16* (2006.01)
*H04L 1/18* (2006.01)
*H04L 5/00* (2006.01)
*H04W 28/06* (2009.01)

(56) References Cited

U.S. PATENT DOCUMENTS

| | | | |
|---|---|---|---|
| 5,768,533 A | 6/1998 | Ran | |
| 6,470,391 B2* | 10/2002 | Takamoto et al. | 709/227 |
| 7,609,697 B2* | 10/2009 | Nishida et al. | 370/394 |
| 7,751,305 B2* | 7/2010 | Jung et al. | 370/203 |
| 7,903,595 B2* | 3/2011 | Choi et al. | 370/311 |
| 8,239,718 B2* | 8/2012 | Obuchi et al. | 714/748 |
| 8,284,752 B2* | 10/2012 | Ketchum et al. | 370/349 |
| 8,416,872 B2* | 4/2013 | Higuchi et al. | 375/267 |
| 2003/0023929 A1* | 1/2003 | Kajita | 714/781 |
| 2004/0258081 A1* | 12/2004 | Hayashi | 370/401 |
| 2005/0135253 A1* | 6/2005 | Cai et al. | 370/236 |
| 2006/0153150 A1* | 7/2006 | Yang et al. | 370/338 |
| 2006/0195767 A1 | 8/2006 | Ihm et al. | |
| 2007/0298822 A1* | 12/2007 | Wan et al. | 455/509 |
| 2008/0089314 A1* | 4/2008 | Meyer et al. | 370/349 |
| 2008/0212514 A1* | 9/2008 | Chen | 370/315 |
| 2009/0307552 A1* | 12/2009 | Harada et al. | 714/748 |
| 2010/0074628 A1* | 3/2010 | Murakami et al. | 398/182 |
| 2010/0157970 A1* | 6/2010 | Gotman et al. | 370/344 |

* cited by examiner

_US 8,984,362 B2_

MAC PDU SPLITTING BASED ON A SUBFRAME SIZE WITH CRC ADDED TO THE SPLIT UNIT

This application is a national phase application based on International Application No. PCT/KR2008/005315, filed on Sep. 9, 2008, which claims priority to Korean Patent Application No. 10-2007-0091729, filed on Sep. 10, 2007, U.S. Provisional Application No. 60/982,731, filed on Oct. 26, 2007, U.S. Provisional Application No. 61/029,378, filed on Feb. 18, 2008, U.S. Provisional Application No. 61/045,614, filed on Apr. 17, 2008 and Korean Patent Application No. 10-2008-0081596, filed on Aug. 20, 2008, all of which are incorporated by reference for all purposes as if fully set forth herein.

TECHNICAL FIELD

The present invention relates to mobile communications, and more particularly, to a method for transmitting signals using a hybrid automatic repeat request (HARQ) in a mobile communication system.

BACKGROUND ART

IEEE (Institute of Electrical and Electronics Engineers) 802.16 standard provides a technology and protocol for supporting broadband wireless access. Standardization of IEEE 802.16 began in 1999 and was approved in 2001 as IEEE 802.16-2001. IEEE 802.16 is based on a single carrier physical layer called 'WirelessMAN-SC'. In the IEEE 802.16a standard approved in 2003, 'WirelessMAN-OFDM' and 'WirelessMAN-OFDMA' were further added to the physical layer. After standardization for IEEE 802.16a was completed, revised IEEE 802.16-2004 standard was approved in 2004. To correct bugs and errors for the IEEE 802.16-2004 standard, IEEE 802.16-2004/Cor1 was completed in 2005 under the format of 'corrigendum'.

An error compensation scheme for ensuring reliable communication includes a forward error correction (FEC) scheme and an automatic repeat request (ARQ) scheme. The FEC scheme corrects errors of a receiving stage by adding a redundant error correction code to information bits. The ARQ scheme corrects errors through data retransmission and includes stop-and-wait (SAW), go-back-N (GBN), and selective repeat (SR) ARQ. Although the FEC scheme is advantageous in that a time delay is small and no additional information transmitted and received between transmitting and receiving stages is necessary, system efficiency in good channel environments is lowered. The ARQ scheme improves transmission reliability, but a time delay occurs and system efficiency in bad channel environments is lowered. To overcome those shortcomings, a HARQ scheme which combines FEC and ARQ has been proposed. The HARQ scheme confirms whether data received by a physical layer includes errors which can not be decoded and requests retransmission upon occurrence of errors, thereby improving performance.

A HARQ mode includes chase combining and incremental redundancy. Chase combining combines error-detected data with retransmitted data without discarding the error-detected data. Incremental redundancy incrementally transmits redundant information added to retransmitted data, thereby reducing the burden of retransmission.

If no error is detected in received data, a receiver transmits an acknowledgement (ACK) signal as a response signal to inform a transmitter that data has been successively received. If an error is detected in received data, the receiver transmits a negative acknowledgement (NACK) signal as a response signal to inform the transmitter that an error has been detected. Upon receiving the NACK signal, the transmitter can retransmit data.

In a HARQ scheme, a receiver basically attempts to correct errors of received data and determines whether to retransmit data using an error detection code. A cyclic redundancy check (CRC) may be used as the error detection code. If an error in received data is detected through a CRC detection process, the receiver transmits a NACK signal to a transmitter. Upon receipt of the NACK signal, the transmitter transmits proper retransmission data according to a HARQ mode (chase combining or incremental redundancy). When receiving the retransmission data, the receiver combines previous data with the retransmission data to perform decoding, thereby improving reception performance.

At a high data transmission rate of a maximum of a few hundred of Mega bits per second (Mbps), the length of an information block transmitted within a unit transmission interval is abruptly increased. If one CRC is attached to a large-size information block, even a small number of bit errors generated in the information block, size of which is increased, causes an error in all bits. Accordingly, a receiver transmits a NACK signal for the entire information block and a transmitter retransmits the entire information block. This may directly result in a decrease in overall system throughput.

Meanwhile, in future generation mobile communication systems, for example, a 3GPP ($3^{rd}$ Generation Partnership Project) LTE (Long Term Evolution)-Advanced system and an IEEE 802.16m system, a multi-carrier support mode is being discussed. In the multi-carrier support mode, a plurality of bandwidths, that is, a successive or intermittent combination of bandwidths in an existing system (e.g., a 3GPP LTE system or an IEEE 802.16e system) is controlled by one common medium access control (MAC) so that a common MAC protocol data unit (PDU) can be transmitted through multiple carriers. If only one CRC is attached when transmitting a large-size information block, i.e., a common MAC PDU, through multiple bands specified by multiple carriers, retransmission of all information bits may be demanded due to a small number of bit errors, or a HARQ process delay may occur.

Hence, in a mobile communication system demanding high transmission rate and/or supporting the above-described multi-carrier mode, a method for efficiently performing a HARQ scheme is needed.

DISCLOSURE

Technical Problem

An object of the present invention devised to solve the problem lies in providing a method for transmitting data using a multiple HARQ scheme in a mobile communication system demanding high transmission rate and/or supporting a multi-carrier mode.

Another object of the present invention devised to solve the problem lies in providing a method for reducing overhead of control information and reducing HARQ latency, when transmitting a large-size information block using a short subframe structure or a resource block structure.

Technical Solution

The object of the present invention can be achieved by providing a method for transmitting data in a mobile communication system which performs a HARQ process upon each of a plurality of transport blocks generated by splitting an information block. The method includes generating a plurality of split-subbursts by arranging a data region including one or more subbursts in a frame and by splitting the subbursts according to the transport blocks, and performing HARQ processes upon the split-subbursts and transmitting the HARQ processed split-subbursts.

One connection identifier (CID) may be allocated to each of the subbursts. One ACK channel may be allocated to each of the split-subbursts.

One ACK channel may be allocated to each of the subbursts, and the ACK channel may be used to transmit ACK/NACK signals for the plurality of split-subbursts.

In another aspect of the present invention, provided herein is a method for transmitting signals in a mobile communication system using a frame structure including a plurality of subframes and a control channel for each of the subframes. The method includes splitting an information block which corresponds to one connection identifier (CID) and has a size greater than a predetermined size in units of a subframe to generate a plurality of split-information blocks, and transmitting the split-information blocks through two or more subframes, each of the split-information blocks being transmitted through one subframe, wherein control information for the information block is transmitted only through a control channel in a first subframe among the two or more subframes.

The method for transmitting signals may further include attaching a cyclic redundancy check (CRC) to each of the split-information blocks. The method may further include receiving a NACK signal for a specific split-information block from a receiving side, when the receiving side fails to receive the specific split-information block.

The splitting an information block may be performed in a physical layer of a transmitting side, and the predetermined size may correspond to a subframe size.

The method may further include encoding the split-information blocks, wherein the split-information blocks may be encoded by one encoder set and may be transmitted through two or more subframes, each of the split-information blocks being transmitted through one subframe.

In still another aspect of the present invention, provided herein is a method for transmitting signals in a mobile communication system using a frame structure including a plurality of subframes and a control channel for each of the subframes. The method includes splitting an information block which corresponds to one connection identifier (CID) and has a size greater than a predetermined size in units of a resource block (RB) having the predetermined size to generate a plurality of split-information blocks, and transmitting the split-information blocks through a plurality of RBs in at least one subframe, each of the split-information blocks being transmitted through one RB, wherein control information for the information block is transmitted only through a control channel in a first subframe, even when the spilt-information blocks are transmitted through two or more subframes.

The transmitting the split-information blocks may include a first transmitting step of transmitting the split-information blocks through a plurality of RBs located in a plurality of frequency regions in one specific subframe, and a second transmitting step of transmitting remaining split-information blocks through at least one RB in a subframe subsequent to the one specific subframe, when all the split-information blocks are not transmitted in the first transmitting step. The transmitting the split-information blocks may include a first transmitting step of transmitting the split-information blocks through at least one RB corresponding to one specific frequency region in a plurality of subframes, and a second transmitting step of transmitting remaining split-information blocks through at least one RB corresponding to a frequency region other than the one specific frequency region in the plurality of subframes, when all the split-information blocks are not transmitted in the first transmitting step.

The method may further include attaching a cyclic redundancy check (CRC) to each of the split-information blocks. The method may further include receiving a NACK signal for a specific split-information block from a receiving side, when the receiving side fails to receive the specific split-information block.

In a further aspect of the present invention, provided herein is a method for transmitting signals through a plurality of frequency bands controlled by one upper layer entity higher than a physical layer. The method includes splitting one information block into a plurality of split-information blocks each having a size corresponding to a size of each of the frequency bands, attaching a cyclic redundancy check (CRC) to each of the split-information blocks, and transmitting the CRC attached split-information blocks through each of the plurality of frequency bands.

The splitting one information block may be performed in the physical layer.

Advantageous Effects

According to the exemplary embodiments of the present invention, even though the size of an information block is increased, multiple HARQ processes are performed in units of a transport block smaller in size than the information block and only an error-detected transport block is retransmitted, thereby improving overall system performance. Further, multiple HARQ can be easily achieved in a mobile communication system based on the IEEE 802.16 standard.

Moreover, even though a large-size information block is transmitted through a plurality of subframes or resource blocks, overhead of a control signal can be reduced and system performance can be improved through combination with a multiple HARQ technique.

In a mobile communication system supporting a multi-carrier mode, physical layer segmentation and a multiple HARQ scheme are applied to flexibly cope with a small number of bit errors and to reduce a HARQ process delay.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. For example, although the following description assumes an IEEE 802.16e system as an example of an existing system, the present invention may be applied in many ways to various systems such as 3GPP and 3GPP2 systems as a method for increasing system efficiency using a multiple HARQ scheme.

The following detailed description includes specific details in order to provide a thorough understanding of the present invention. However, it will be apparent to those skilled in the art that the present invention may be practiced without such specific details. In some instances, known structures and devices are omitted or are shown in block diagram form, focusing on important features of the structures and devices, so as not to obscure the concept of the present invention. The same reference numbers will be used throughout this specification to refer to the same or like parts.

Figure 1:
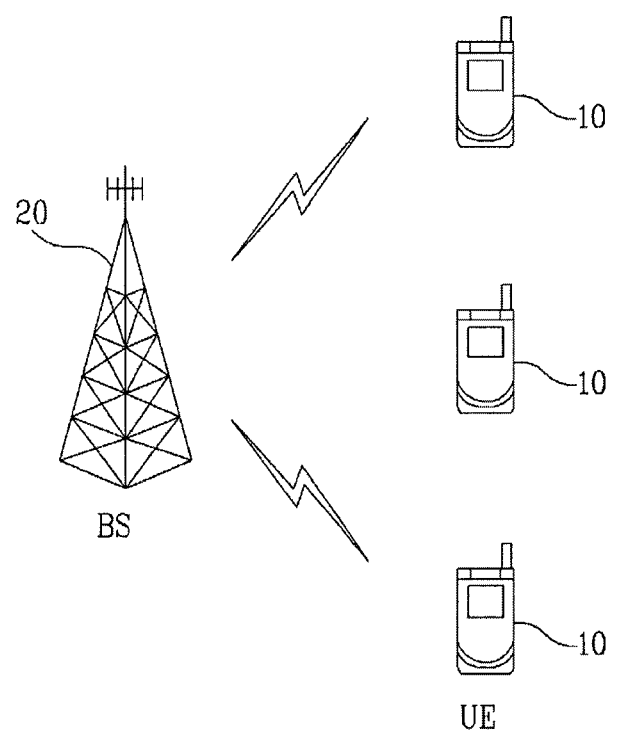
FIG. 1 is a block diagram illustrating a mobile communication system.

FIG. 1 is a block diagram illustrating a mobile communication system.

Mobile communication systems are widely used to provide various communication services such as voice, packets, and data. Referring to FIG. 1, a mobile communication system includes a user equipment (UE) 10 and a base station (BS) 20. The user equipment 10 may be fixed or mobile and may be called other terms such as a mobile station (MS), a user terminal (UT), a subscriber station (SS), and a mobile device. The base station 20 generally refers to a fixed station communicating with the user equipment 10 and may be called other terms such as a node B, a base transceiver system (BTS), and an access point. One or more cells may exist in the base station 20.

The mobile communication system may be an orthogonal frequency division multiplexing (OFDM)/orthogonal frequency division multiple access (OFDMA) based system.

OFDM uses a plurality of orthogonal subcarriers. OFDMA uses orthogonal features between inverse fast Fourier transform (IFFT) and fast Fourier transform (FFT). A transmitter performs IFFT upon data and then transmits the data. A receiver performs FFT upon a received signal to restore original data. The transmitter uses IFFT to combine multiple subcarriers and the receiver uses corresponding FFT to separate the multiple subcarriers.

Figure 2:
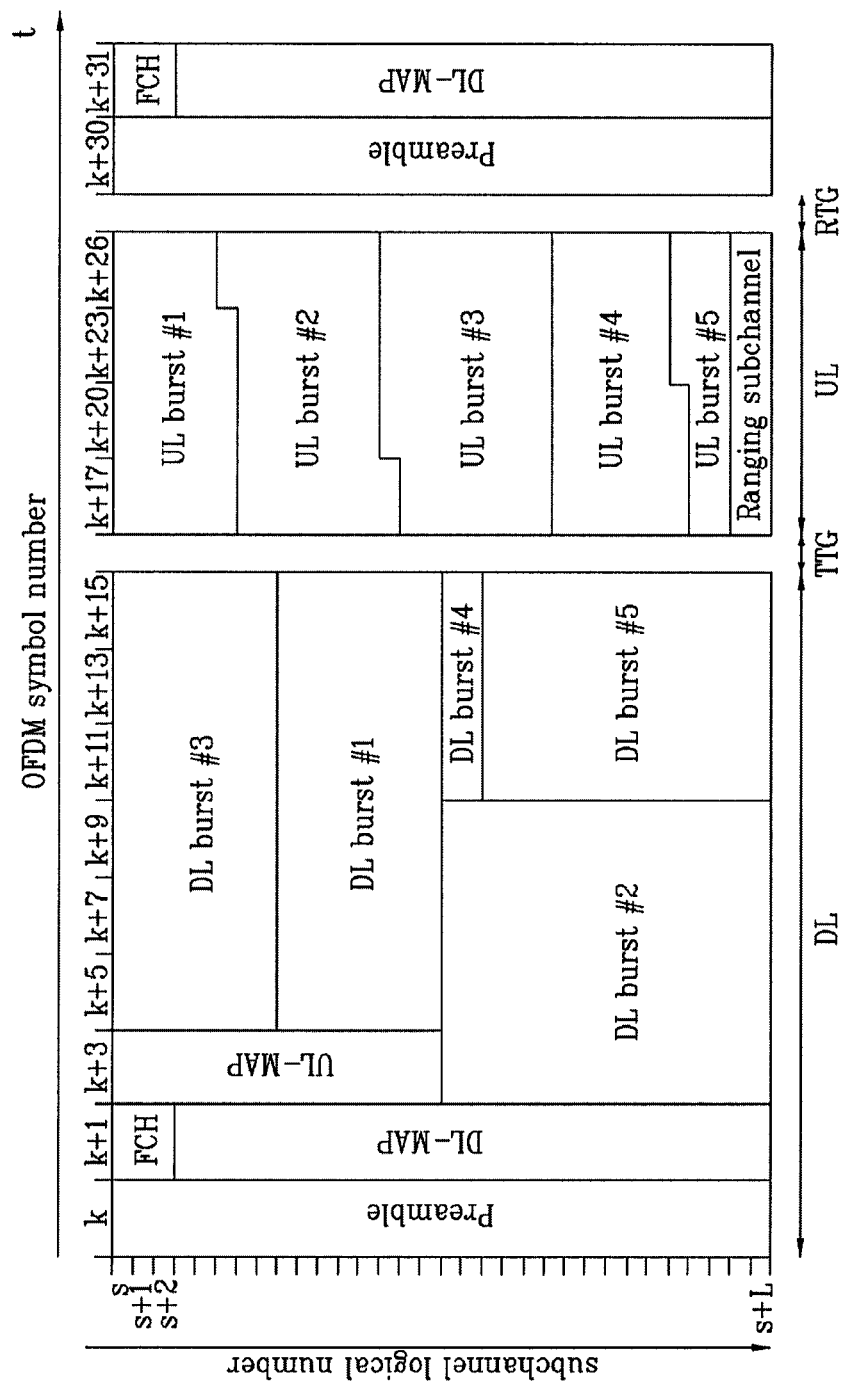
FIG. 2 illustrates an example of a frame structure.

FIG. 2 illustrates an example of a frame structure.

A frame is a data sequence during a fixed time used by a physical specification. The frame may refer to IEEE standard 802.16-2004, 8.4.4.2, "part 16: Air Interface for Fixed Broadband Wireless Access Systems" (hereinafter, referred to as Reference 1).

Referring to FIG. 2, a frame includes a downlink (DL) frame and an uplink (UL) frame. Time division duplex (TDD) shares the same frequency in uplink and downlink transmission but occurs in a different time. The downlink frame precedes the uplink frame in time. The downlink frame is started in order of a preamble, a frame control header (FCH), a downlink map (DL-MAP), an uplink map (UL-MAP), and burst areas. A guard time for discriminating between the uplink frame and the downlink frame is inserted to a middle part (i.e., between the downlink frame and the uplink frame) of the frame and to a last part (i.e., after the uplink frame) of the frame. A transmit/receive transition gap (TTG) is a gap between a downlink burst and a subsequent uplink burst. A receive/transmit transition gap (RTG) is a gap between an uplink burst and a subsequent downlink burst.

The preamble is used for initial synchronization between a base station and a user equipment, cell search, frequency offset, and channel estimation. The FCH includes the length of a DL-MAP message and coding scheme information of DL-MAP.

DL-MAP is an area to which a DL-MAP message is transmitted. The DL-MAP message defines access to a downlink channel. The DL-MAP message includes a configuration variation count of a downlink channel descriptor (DCD), and a base station identifier (ID). The DCD describes a downlink burst profile applied to a current map. The downlink burst profile represents characteristics of a downlink physical channel. The DCD is periodically transmitted by the base station through a DCD message.

UL-MAP is an area to which a UL-MAP message is transmitted. The UL-MAP message defines access to an uplink channel. The UL-MAP message includes a configuration variation count of an uplink channel descriptor (UCD), and an effective start time of uplink allocation defined by UL-MAP. The UCD describes an uplink burst profile. The uplink burst profile represents characteristics of an uplink physical channel. The UCD is periodically transmitted by the base station through a UCD message.

Hereinafter, a slot refers to a minimally assignable data unit and is defined by time and a subchannel. The number of subchannels depends on an FFT size and time-frequency mapping. The subchannel includes a plurality of subcarriers. The number of subcarriers per subchannel varies according to a permutation scheme. Permutation refers to mapping a logical subchannel to a physical subcarrier. A subchannel in a full usage of suchannels (FUSC) includes 48 subcarriers and a subchannel in a partial usage of subchannels (PUSC) includes 24 or 16 subcarriers. Segment refers to at least one subchannel set.

To map data in a physical layer to a physical subcarrier, two steps are generally needed. In the first step, the data is mapped to at least one data slot on at least one logical subchannel. In the second step, each logic subchannel is mapped to the physical subcarrier. This process is called permutation. Reference 1 describes a permutation scheme of FUSC, PUSC, optional-FUSC, optional-PUSC, adaptive modulation and coding (AMC), etc. A set of OFDM symbols using the same permutation scheme is called a permutation zone and one frame includes at least one permutation zone.

FUSC and optional-FUSC are used only for downlink transmission. FUSC is comprised of one segment including all subchannel groups. Each subchannel is mapped to a physical subcarrier distributed throughout all physical channels. This mapping is changed every OFDM symbol. A slot is comprised of one subchannel on one OFDM symbol. Optional-FUSC and FUSC employ different allocation methods.

PUSC is used for both downlink transmission and uplink transmission. In downlink transmission, each physical channel is divided into clusters each including 14 contiguous subcarriers on 2 OFDM symbols. The physical channel is mapped to 6 groups. In each group, a pilot is allocated to each cluster with a fixed location. In uplink transmission, subcarriers are divided into tiles each including 4 contiguous physical subcarriers on 3 OFDM symbols. A subchannel includes 6 tiles. Pilots are allocated to edges of each tile. Optional-PUSC is used only for uplink transmission. A tile is comprised of 3 contiguous physical subcarriers on 3 OFDM symbols. A pilot is allocated to the center of the tile.

A multiple HARQ scheme will now be described.

Multiple HARQ refers to splitting an information block into multiple blocks and performing HARQ processes for split blocks. A HARQ mode may use chase combining and/or incremental redundancy (IR).

Figure 3:
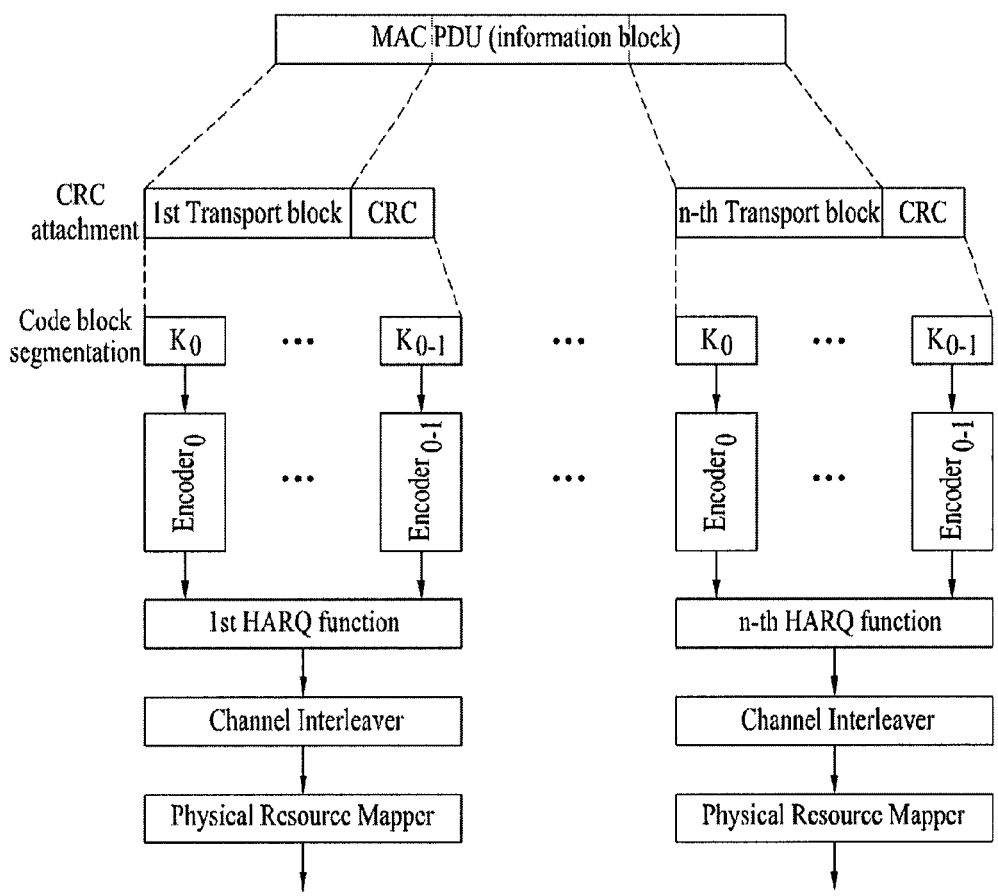
FIG. 3 illustrates an example of processing of an information block to perform multiple HARQ.

FIG. 3 illustrates an example of processing of an information block to perform multiple HARQ.

Referring to FIG. 3, the information block is divided into a plurality of transport blocks. The information block may be called a MAC protocol data unit (PDU). If a layer performing HARQ is a physical layer, a MAC PDU is a data unit transmitted to the physical layer from a MAC layer which is an upper layer of the physical layer. Although the transport blocks are described as being formed by segmentation of the information block, the split-information blocks formed by splitting the information block corresponding to a MAC PDU may be referred to by other terms other than transport blocks.

Hereinafter, the split-information blocks will be referred to as 'transport blocks' for convenience of description.

The exemplary embodiment of the present invention proposes to attach a CRC, which is an error detection code, to each transport block. A CRC-attached transport block is segmented into blocks of a proper size for channel encoding. The segmented blocks are called code blocks. An encoder performs channel encoding for each code block and generates coded bits.

In this exemplary embodiment, one HARQ function is performed with respect to each transport block. That is, multiple HARQ processes are proposed in which multiple CRCs are attached to one information block and a HARQ process is performed in units of a CRC-attached transport block. Thereafter, interleaving is performed upon each HARQ process through a channel interleaver and the interleaved bits are mapped to physical resources for transmission.

In this exemplary embodiment, multiple CRCs are applied to the information block. Namely, an individual HARQ process is applied to each transport block to which a CRC is attached. Even if a large-size information block is received from an upper layer, a physical layer configures transport blocks of a proper size and attaches an individual CRC to each transport block. Then retransmission is requested only for an error-generated transport block.

The number of HARQ processes may vary according to the size of the information block. The maximum number of HARQ processes is limited to a range within which overhead generated in accordance with an increase of the number of HARQ processes is not great.

Although data transmission in downlink will be described hereinbelow to clarify description, the present invention may be applied to uplink transmission.

Figure 4:
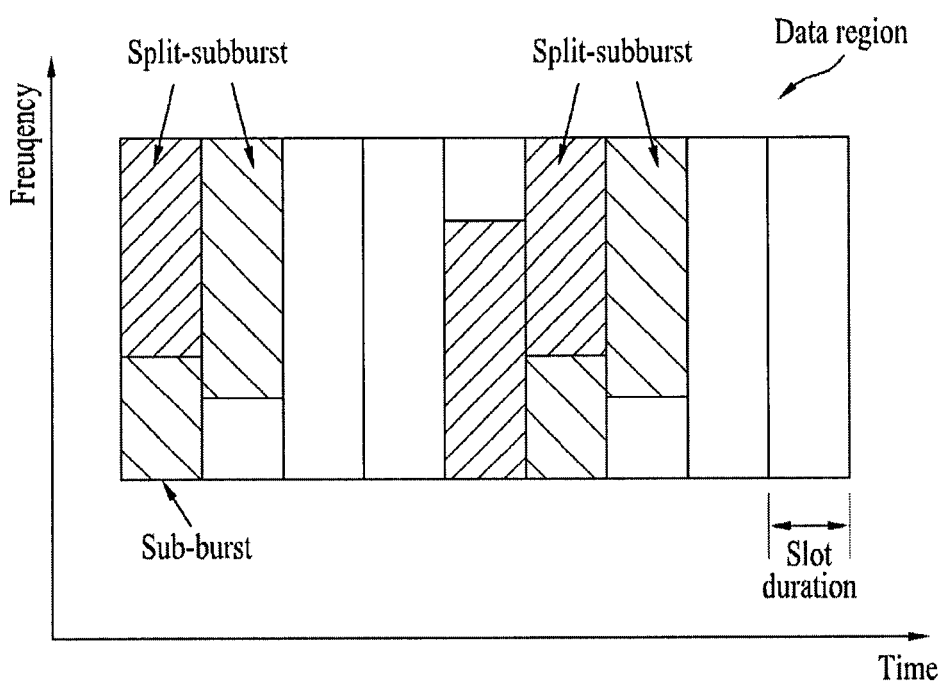
FIG. 4 illustrates an example of a resource allocation structure according to an exemplary embodiment of the present invention.

FIG. 4 illustrates an example of a resource allocation structure according to an exemplary embodiment of the present invention.

Referring to FIG. 4, a data region is a logical 2-dimensional resource allocation region including at least one subchannel and at least one OFDM symbol. The data region may correspond to one burst on a frame. In downlink transmission, information about the data region may be transmitted to a user equipment from a base station through a HARQ DL MAP message.

The data region is partitioned into at least one subburst according to multiple HARQ processes for each user. Multiple HARQ processes are performed with respect to one information block in one subburst. One connection identifier (CID) may be allocated to one subburst. A CID is a value for confirming connection of the base station and the user equipment in MAC. All subbursts belonging to one data region operate in the same HARQ mode (chase combining or IR).

For multiple HARQ processes, one subburst includes a plurality of split-subbursts each performing each HARQ process. One split-subburst corresponds to one HARQ process. A subburst includes split-subbursts having the same number as the number of HARQ processes operating per CID. In case of a CID in which n HARQ processes operate, a subburst includes n split-subbursts. When using PUSC permutation, all split-subbursts contained in one subburst may use the same MCS.

Each subburst, and split-subbursts belonging to a subburst are allocated in units of a slot. Slots may be allocated in a frequency-first order. Namely, slots are allocated with increasing subchannels beginning from a slot having the smallest OFDM symbol and the smallest subchannel. In the last subchannel, the number of OFDM symbols is increased by as much as a slot duration.

One burst is allocated to a data stream which uses a HARQ process operating in the same mode. Each burst is divided into subbursts according to users (or CIDs). One subburst configures split-subbursts to support multiple HARQ processes.

Figure 5:
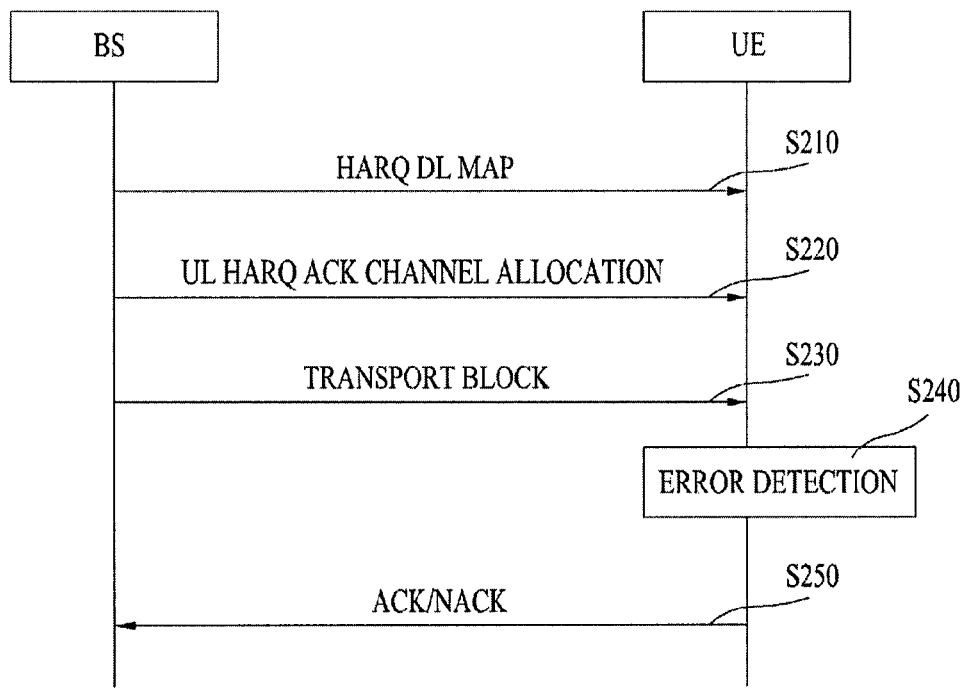
FIG. 5 is a flow diagram illustrating a data transmitting method according to an exemplary embodiment of the present invention.

FIG. 5 is a flow diagram illustrating a data transmitting method according to an exemplary embodiment of the present invention.

Referring to FIG. 5, a base station (BS) transmits a HARQ DL MAP message to a user equipment (UE) in step S210. The HARQ DL MAP message defines at least one data region performing HARQ. For example, the HARQ DL MAP message may include a reduced connection identifier (RCID), OFDM symbol offset, subchannel offset, the number of OFDM symbols, the number of subchannels, HARQ mode, subburst information, etc. The RCID is a reduced form of bits of a CID. The HARQ mode may designate chase combining or IR. The subburst information may include specific HARQ information applied to a subburst. The subburst information may include information about the number of subbursts, split-subburst information, and the number of ACK channels.

The base station transmits a UL HARQ ACK channel allocation message to the user equipment in step S220. The UL HARQ ACK channel allocation message defines one or more ACK channels in an uplink resource region. The ACK channel is a channel transmitting an ACK/NACK signal.

The base station transmits an information block to the user equipment in step S230. The information block is divided into a plurality of transport blocks. A HARQ process is performed with respect to each transport block.

The user equipment decodes received data and determines an error in units of a transport block in step S240. Since a determination as to an error is made in units of a transport block, the burden of retransmitting the whole information block of a large size is reduced.

After determination of an error, the user equipment transmits an ACK/NACK signal as a response signal to the base station through an ACK channel in step S250. The response signal may be an ACK signal or a NACK signal. The ACK signal is a response signal informing the base station that data has been successfully received without an error in the decoded transport block. The NACK signal is a response signal requesting data retransmission because an error has been detected in the decoded transport block.

The user equipment receiving data decodes all split-subbursts contained in one subburst by the same MCS and detects an error in a transport block through CRC detection. The ACK/NACK signal relating to retransmission is transmitted in units of a transport block. The number of ACK channels necessary for a response increases in proportion to the number of HARQ processes.

The information block is segmented into a plurality of transport blocks and a HARQ process may be performed with respect to each transport block. Since a CRC is attached to each transport block, retransmission is performed only for an error-detected transport block and thus the burden of retransmitting the entire information block is reduced.

Subburst information contained in the HARQ DL MAP message will now be described.

The subburst information may vary according whether a HARQ mode or a multiple-input multiple-output (MIMO) mode is supported or according to a channel encoding scheme. Hereinbelow, a description of fields relating to a split-subburst will be mainly given.

The following Table 1 illustrates an example of subburst information for 'DL HARQ chase subburst'.

TABLE 1

| Syntax | Size | Notes |
|---|---|---|
| N sub burst[ISI] | 4 bits | Number of sub-bursts in the 2D rectangular region is this field value plus 1 |
| N HARQ process | n bits | Number of HARQ processes |
| N ACK channel | 4 + n bits | If the size of HARQ process is n bits, the size of this field is (4 + n) bits. |
| For for(j=0; j<Number of sub-bursts; j++){ | — | — |
|     RCID_IE( ) | variable | — |
|     ACK disable | 1 bit | When 'ACK Disable' = =1, the allocated sub-burst does not require an ACK to be transmitted by the SS in the ACKCH Region. In this case, no ACK channel is allocated for the sub-burst in the ACKCH Region. For the burst, BS shall not perform HARQ retransmission and MS shall ignore ACID, AI_SN and SPID, which shall be set to '0' by BS if they exist. |
|     Sub-Burst DIUC Indicator | 1 bit | If Sub-Burst DIUC Indicator is 1, this indicates that DIUC is explicitly allocated for this sub-burst. Otherwise, the sub-burst will use the same DIUC as the previous sub-burst. If j is 0 then this indicator shall be 1. |
|     If(Sub-Burst DIUC Indicator = = 1 or j == 0){ | — | In the first sub-burst, DIUC shall be allocated. |
|         DIUC | 4 bits | — |
|         Repetition Coding Indication | 2 bits | — |
|     } | — | — |
|     For(i=0;i<N HARQ process; i++){ | | |
|         Duration | 10 bits | Duration in slots. Length of each transport block. |

TABLE 1-continued

| Syntax | Size | Notes |
|---|---|---|
| If(ACK disable = = 0){ | — | If stream does not require ACK/NACK feedback, ACID and AI_SN are not allocated. |
|     ACID | 4 + n bits | If the size of HARQ process is n bits, the size of this field is (4 + n) bits. |
|     AI_SN | 1 bit | — |
|   } | | |
| } | | |
| } | | |

A field for multiple HARQ processes is needed to apply n HARQ processes to an information block having one CID. 'N HARQ process' denotes the number of HARQ processes. If the number of HARQ processes is m, the size of an 'N HARQ process' field is $\lceil \log_2 m \rceil$ bits. Here, $\lceil a \rceil$ means an integer greater than 'a'. 'N ACK channel' denotes the number of split-subbursts requesting ACK/NACK in a corresponding burst. When the number of bits of 'N HARQ process' is n, n bits are further added to the size of an 'N ACK channel' field.

In each split-subburst, an ACID and duration are defined according to whether to transmit ACK/NACK. Duration denotes the length of a split-subburst. Split-subbursts may have different lengths. ACID is a field indicating a HARQ channel ID and n bits are further added to the size of an ACID field.

The following Table 2 illustrates an example of subburst information for 'DL HARQ IR CTC subburst'.

TABLE 2

| Syntax | Size | Notes |
|---|---|---|
| N sub burst | 4 bits | "Number of sub-bursts" in the 2D region is this field value plus 1 |
| N HARQ process | N bits | Number of HARQ processes |
| N ACK channel | 4 + n bits | If the size of HARQ process is n bits, the size of this field is (4 + n) bits. |
| For for(j=0; j<Number of sub-bursts; j++){ | — | — |
|     RCID_IE( ) | variable | — |
|     ACK disable | 1 bit | When 'ACK Disable' = =1, the allocated sub-burst does not require an ACK to be transmitted by the SS in the ACKCH Region (see 8.4.5.4.24). In this case, no ACK channel is allocated for the sub-burst in the ACKCH Region. For the burst, BS shall not perform HARQ retransmission and MS shall ignore ACID, AI_SN and SPID, which shall be set to '0' by BS if they exist. The CRC shall be appended at the end of each sub-burst regardless of the ACK disable bit. |
|     NEP | 4 bits | — |
|     NSCH | 4 bits | — |
|     If(ACK disable = = 0){ | — | — |
|         For(i=0;i<N HARQ process; i++){ | | |
|             SPID | 2 bits | — |
|             ACID | 4 + n bits | If the size of HARQ process is n bits, the size of this field is (4 + n) bits. |
|             AI_SN | 1 bit | — |
|         } | | |
|     } | | |
| } | | |

The following Table 3 illustrates an example of subburst information for 'MIMO DL Chase HARQ subburst'.

TABLE 3

| Syntax | Size | Notes |
|---|---|---|
| N sub burst | 4 bits | Number of sub-bursts in the 2D region. "Number of sub-bursts" in the 2D region is this field value plus 1 |

TABLE 3-continued

| Syntax | Size | Notes |
|---|---|---|
| N HARQ process | n bits | Number of HARQ processes |
| N ACK channel | 4 + n bits | If the size of HARQ process is n bits, the size of this field is (4 + n) bits. |
| For for(j=0; j<Number of sub-bursts; j++){ | — | — |
|     MU Indicator | 1 bit | Indicates whether this DL burst is intended for multiple SS. |
|     Dedicated MIMO DL Control Indicator | 1 bit | — |
|     ACK disable | 1 bit | When 'ACK Disable' = =1, the allocated sub-burst does not require an ACK to be transmitted by the SS in the ACKCH Region (see 8.4.5.4.24). In this case, no ACK channel is allocated for the sub-burst in the ACKCH Region. For the burst, BS shall not perform HARQ retransmission and MS shall ignore ACID, AI_SN and SPID, which shall be set to '0' by BS if they exist. The CRC shall be appended at the end of each sub-burst regardless of the ACK disable bit. |
|     For(i=0;i<N_layer; i++){ | — | — |
|         DIUC | 4 bits | — |
|         Repetition Coding Indication | 2 bits | 0b00-No repetition coding<br>0b01-Repetition coding of 2 used<br>0b10-Repetition coding of 4 used<br>0b11-Repetition coding of 6 used |
|     For(k=0;k<N HARQ process; k++){ | | |
|         Duration | 10 bits | — |
|         If(ACK disable = = 0){ | — | — |
|             ACID | 4 + n bits | If the size of HARQ process is n bits, the size of this field is (4 + n) bits. |
|             AI_SN | 1 bit | — |
|         } | | |
|     } | | |
| } | | |
| } | | |

Table 4 illustrates an example of subburst information for 'MIMO UL Chase HARQ subburst'.

TABLE 4

| Syntax | Size | Notes |
|---|---|---|
| RCID IE( ) | variable | — |
| N HARQ process | n bits | Number of HARQ processes |
| ACK disable | 1 bit | When 'ACK Disable' = =1, the allocated sub-burst does not require an ACK to be transmitted by the BS in the HARQ ACK BITMAP. In this case, no bit position is allocated for the sub-burst in the HARQ ACK BITMAP. For the burst, MS shall not perform HARQ retransmission and MS shall ignore ACID, AI_SN and SPID, which shall be set to '0' by BS if they exist. The CRC shall be appended at the end of each sub-burst regardless of the ACK disable bit |
| Dedicated UL Control Indicator | 1 bit | — |
| If(Dedicated UL Control Indicator = =1){ | — | — |
|     Dedicated UL Control IE ( ) | variable | — |
| } | — | — |
| UIUC | 4 bits | — |
| Repetition Coding Indication | 2 bits | 0b00-No repetition coding<br>0b01-Repetition coding of 2 used<br>0b10-Repetition coding of 4 used<br>0b11-Repetition coding of 6 used |

TABLE 4-continued

| Syntax | Size | Notes |
|---|---|---|
| For(i=0;i<N HARQ process; i++){ | — | — |
|     Duration | 10 bits | Duration in slots. Length of each transport block. |
|     If(ACK disable == 0){ | | If CID does not require ACK/NACK feedback, ACID and AI_SN are not allocated. |
|         ACID | 4 + n bits | If the size of HARQ process is n bits, the size of this field is (4 + n) bits. |
|         AI_SN | 1 bit | — |
|     } | — | — |
| } | — | — |

When an ACK channel is not used in uplink, an 'N ACK channel' field may not be defined.

Meanwhile, in the above-described embodiment, one CID per subburst is allocated and a plurality of split-subbursts within one CID is defined. However, a CID may be allocated to an individual transport block. One CID may be allocated to each HARQ process. Since a HARQ process is performed upon each subburst, it is not necessary to additionally define a split-subburst.

Table 5 illustrates an example of subburst information for 'DL HARQ Chase subburst'.

TABLE 5

| Syntax | Size | Notes |
|---|---|---|
| N CID | 4 bits | Number of CIDs contained in a corresponding burst |
| N HARQ process | n bits | Number of HARQ processes |
| N ACK channel | 4 + n bits | If the size of HARQ process is n bits, the size of this field is (4 + n) bits. |
| For for(j=0; j<N CID; j++){ | — | Repeated as many times as the number of CIDs contained in a burst. |
|     RCID_IE( ) | variable | — |
|     ACK disable | 1 bit | When 'ACK Disable' ==1, the allocated sub-burst does not require an ACK to be transmitted by the SS in the ACKCH Region. In this case, no ACK channel is allocated for the sub-burst in the ACKCH Region. For the burst, BS shall not perform HARQ retransmission and MS shall ignore ACID, AI_SN and SPID, which shall be set to '0' by BS if they exist. |
|     Sub-Burst DIUC Indicator | 1 bit | If Sub-Burst DIUC Indicator is 1, this indicates that DIUC is explicitly allocated for this sub-burst. Otherwise, the sub-burst will use the same DIUC as the previous sub-burst. If j is 0 then this indicator shall be 1. |
|     If (Sub-Burst DIUC Indicator == 1 or j == 0){ | — | In the first sub-burst, DIUC shall be allocated. |
|         DIUC | 4 bits | — |
|     } | — | — |
|     For(i=0;i<N HARQ process; i++){ | | |
|         Duration | 10 bits | Duration in slots. Length of each transport block. |
|         If(ACK disable == 0){ | | If stream does not require ACK/NACK feedback, ACID and AI_SN are not allocated. |
|             ACID | 4 + n bits | If the size of HARQ process is n bits, the size of this field is (4 + n) bits. |
|             AI_SN | 1 bit | — |
|         } | | |
|     } | | |
| } | | |

In Table 5, 'N CID' denotes the number of CIDs included in a corresponding burst. 'N HARQ process' denotes the number of HARQ processes. 'N ACK channel' denotes the number of subbursts requesting transmission of an ACK/NACK signal in a corresponding burst.

Table 6 illustrates an example of subburst information for 'DL HARQ IR CTC subburst'.

TABLE 6

| Syntax | Size | Notes |
| --- | --- | --- |
| N CID | 4 bits | Number of CIDs contained in a corresponding burst |
| N HARQ process | n bits | Number of HARQ processes |
| N ACK channel | 4 + n bits | If the size of HARQ process is n bits, the size of this field is (4 + n) bits. |
| For for(j=0; j<N CID; j++){ | — | Repeated as many times as the number of CIDs contained in a burst. |
|     RCID_IE( ) | variable | — |
|     ACK disable | 1 bit | When 'ACK Disable' = =1, the allocated sub-burst does not require an ACK to be transmitted by the SS in the ACKCH Region. In this case, no ACK channel is allocated for the sub-burst in the ACKCH Region. For the burst, BS shall not perform HARQ retransmission and MS shall ignore ACID, AI_SN and SPID, which shall be set to '0' by BS if they exist. The CRC shall be appended at the end of each sub-burst regardless of the ACK disable bit. |
|     NEP | 4 bits | — |
|     NSCH | 4 bits | — |
|     If(ACK disable = = 0) { | — | — |
|         For(i=0;i<N HARQ process; i++){ | | |
|         SPID | 2 bits | — |
|         ACID | 4 + n bits | If the size of HARQ process is n bits, the size of this field is (4 + n) bits. |
|         AI_SN | 1 bit | — |
|         } | | |
|     } | | |
|     Reserved | 2 bits | Shall be set to zero |
|     Dedicated DL Control Indicator | 2 bits | LSB #0 indicates inclusion of CQI control. LSB #1 indicates inclusion of Dedicated DL control IE. |
| } | — | — |

Table 7 illustrates an example of subburst information for 'MIMO DL Chase HARQ subburst'.

TABLE 7

| Syntax | Size | Notes |
| --- | --- | --- |
| N CID | 4 bits | Number of CIDs contained in a corresponding burst |
| N HARQ process | n bits | Number of HARQ processes |
| N ACK channel | 4 + n bits | If the size of HARQ process is n bits, the size of this field is (4 + n) bits. |
| For for(j=0; j<N CID; j++){ | — | Repeated as many times as the number of CIDs contained in a burst. |
|     MU Indicator | 1 bit | Indicates whether this DL burst is intended for multiple SS. |
|     Dedicated MIMO DL Control Indicator | 1 bit | — |
|     ACK disable | 1 bit | When 'ACK Disable' = =1, the allocated sub-burst does not require an ACK to be transmitted by the BS in the HARQ ACK BITMAP. In this case, no bit position is allocated for the sub-burst in the HARQ ACK BITMAP. For the burst, MS shall not perform HARQ retransmission and MS shall |

TABLE 7-continued

| Syntax | Size | Notes |
|---|---|---|
| | | ignore ACID, AI_SN and SPID, which shall be set to '0' by BS if they exist. The CRC shall be appended at the end of each subburst regardless of the ACK disable bit. |
| For (i=0; i<N_layer; i++){ | — | — |
|   DIUC | 4 bits | — |
|   Repetition Coding Indication | 2 bits | 0b00-No repetition coding<br>0b01-Repetition coding of 2 used<br>0b10-Repetition coding of 4 used<br>0b11-Repetition coding of 6 used |
|   For(k=0;k<N HARQ process; k++){ | — | — |
|     Duration | 10 bits | |
|     If(ACK disable = = 0){ | — | |
|       ACID | 4 + n bits | If the size of HARQ process is n bits, the size of this field is (4 + n) bits. |
|       AI_SN | 1 bit | — |
|     }<br>  }<br>}<br>} | — | — |

A structure of an ACK channel will now be described.

Whether to retransmit data transmitted in uplink or downlink is transmitted through an ACK channel. A receiver receiving data decodes all split-subbursts belonging to one subburst by the same MCS level and transmits an ACK signal or a NACK signal through CRC confirmation, thereby informing a transmitter whether to retransmit data. The ACK/NACK signal is transmitted in units of a transport block and the number of ACK channels used to transmit the ACK/NACK signal increases in proportion to the number of HARQ processes.

Information about a radio resource allocated to an ACK channel is transmitted to a user equipment from a base station through a UL HARQ ACK channel allocation message.

The ACK channel may be allocated to a ½ subchannel. Since one subchannel includes 6 tiles, 2 subchannels include 3 tiles.

Figure 6:
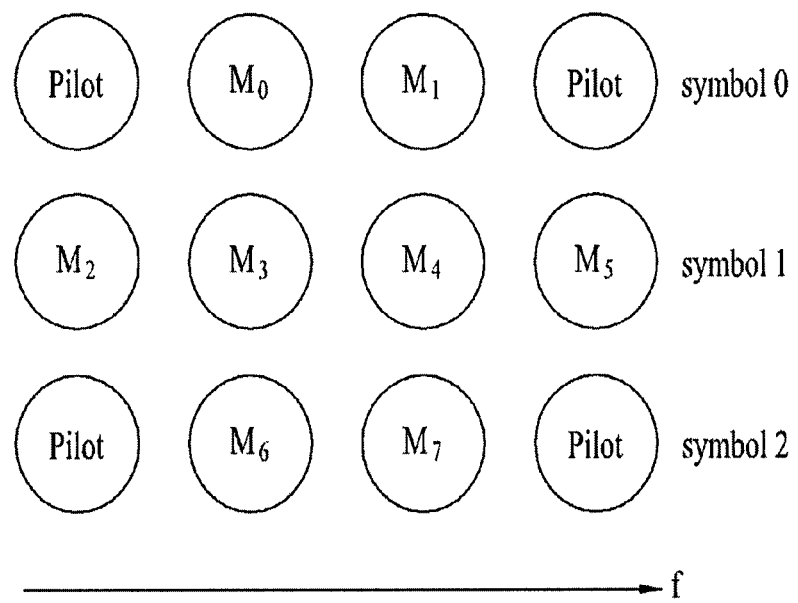
FIG. 6 illustrates an example of a tile.

FIG. 6 illustrates an example of a tile indicating a structure in PUSC permutation.

Referring to FIG. 6, one tile is comprised of 12 subcarriers of 4 subcarriers by 3 OFDM symbols. The 12 subcarriers include 8 data subcarriers M0, . . . , M7 and 4 pilot subcarriers.

One vector is mapped to 8 data subcarriers included in one tile. Table 8 illustrates 8 vectors mapped to one tile.

TABLE 8

| Vector Index | $M_0, M_1, \ldots, M_7$ |
|---|---|
| 0 | P0, P1, P2, P3, P0, P1, P2, P3 |
| 1 | P0, P3, P2, P1, P0, P3, P2, P1 |
| 2 | P0, P0, P2, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

In Table 8, a symbol constituting each vector is a quadrature phase shift keying (QPSK) symbol and is as follows.

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

[Equation 1]

A one-bit ACK/NACK signal may be allocated to a ½ subchannel as follows.

TABLE 9

| 1-bit ACK symbol | Vector indices per tile<br>Tile(0), Tile(1), Tile(2) |
|---|---|
| 0 | 0, 0, 0 |
| 1 | 4, 7, 2 |

For a radio resource of an ACK channel, one ACK channel is allocated to a ½ subchannel and ACK channels are sequentially allocated in order of split-subbursts. For example, an ACK/NACK signal for a k-th split-subburst is transmitted through a k-th ½ subchannel in an ACK channel region to which the ACK channel is allocated.

If the number of bits of a payload included in the ACK channel increases, an ACK/NACK signal for multiple split-subbursts can be transmitted during one time frame. For instance, an ACK channel having a 3-bit payload can be configured in a ½ subchannel as indicated in the following Table 10.

TABLE 10

| 3-bit payload<br>(binary) | Fast-feedback vector indices per tile<br>Even = {Tile(0), Tile(2), Tile(4)} or<br>Odd = {Tile(1), Tile(3), Tile(5)} |
|---|---|
| 000 | 0, 0, 0 |
| 001 | 1, 1, 1 |
| 101 | 2, 2, 2 |
| 011 | 3, 3, 3 |

TABLE 10-continued

| 3-bit payload (binary) | Fast-feedback vector indices per tile Even = {Tile(0), Tile(2), Tile(4)} or Odd = {Tile(1), Tile(3), Tile(5)} |
|---|---|
| 100 | 4, 4, 4 |
| 101 | 5, 5, 5 |
| 110 | 6, 6, 6 |
| 111 | 7, 7, 7 |

In this case, one ACK channel may be allocated to a subburst including 3 split-subbursts. Overhead according to transmission of an ACK/NACK signal can be reduced by transmitting an ACK/NACK signal for a plurality of split-subbursts through one ACK channel.

Although Table 10 shows a 3-bit ACK channel, an ACK channel having 2-bit or more payloads may be configured according to the number of multiple HARQ processes operating in one subburst.

Hereinafter, a description will be given of a method for reducing overhead of control information transmission when data is transmitted in a smaller unit than a frame, that is, in units of a subframe and a method for combining such a method with the above-described HARQ scheme.

In the existing IEEE 802.16e system, data is transmitted in units of a burst as illustrated in FIG. 2. Allocation information for a data burst is provided through DL-MAP and UL-MAP. Specifically, in DL-MAP and UL-MAP, a start point of a data allocation region is indicated using OFDM symbol offset and subchannel offset. In the frame structure illustrated in FIG. 2, it is assumed that the number of OFDM symbols (DL subframe+UL subframe) is usually 48 in a frame of 5 ms.

In a system using the frame structure shown in FIG. 2, large overhead occurs due to a large-size frame in order to indicate a data allocation region (i.e., a burst) in MAP. Furthermore, since the large-size frame should transmit ACK/NACK for transmission data in a frame after a few transmission time intervals (TTIs), the large-size frame causes a delay of ACK/NACK transmission.

To improve overall system performance by reducing overhead generated due to a large-size frame and an ACK/NACK delay and by efficiently transmitting control information, a standard organization such as IEEE 802.16m is discussing a new frame structure. Although detailed frame structure (control channel structure, location, etc.) is heavily debated, a discussion about using the following structure in the IEEE 802.16m standard has been focused upon.

Figure 7:
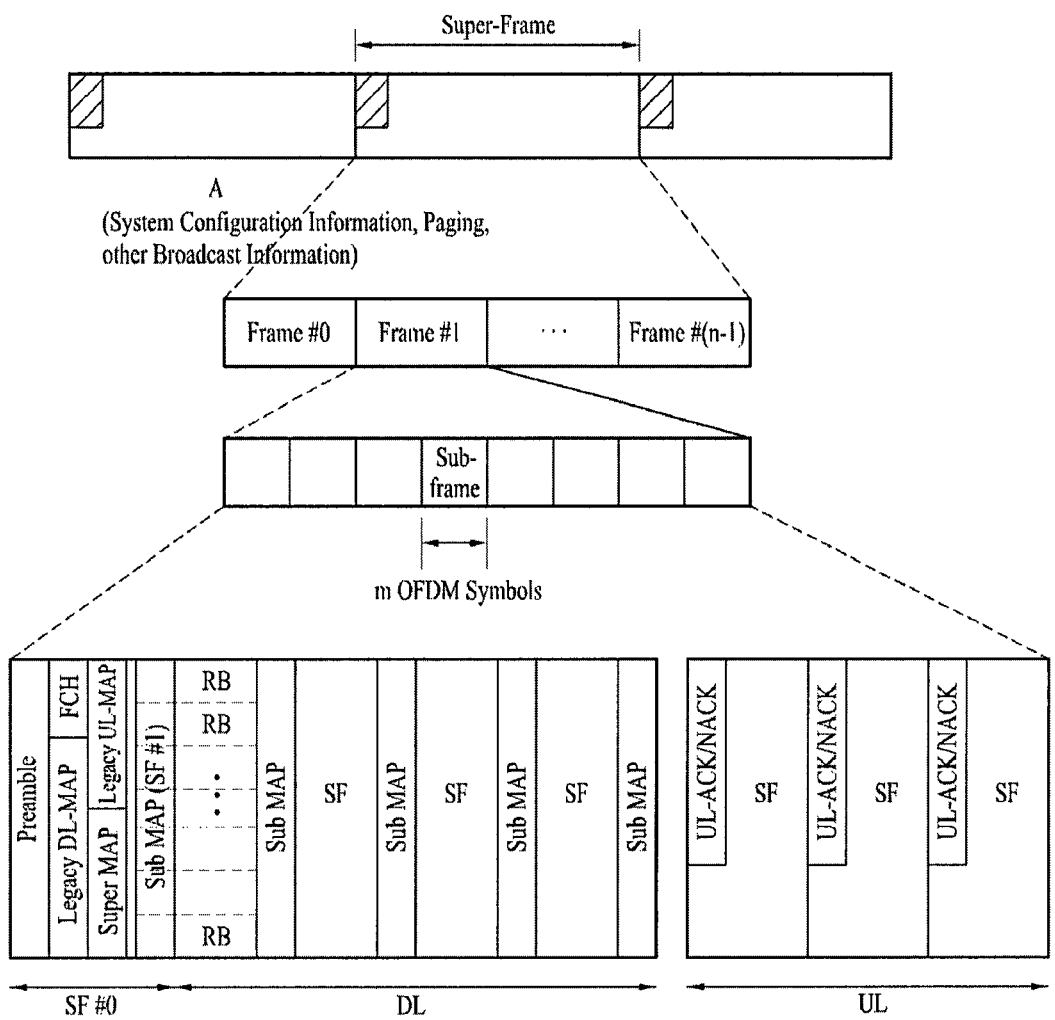
FIG. 7 illustrates an example of a frame structure proposed in the IEEE 802.16m standard.

FIG. 7 illustrates an example of a frame structure proposed in the IEEE 802.16m standard.

The IEEE 802.16m standard assumes the following. A superframe includes a plurality of frames. Each superframe includes, at a location denoted by 'A', a control channel for transmission of system configuration information, paging, and other broadcast information. Each frame includes a plurality of subframes each having a length of m OFDM symbols. A submap for resource mapping indication signaling is constructed before each subframe. The location of the submap and a resource allocation method are being discussed. However, discussion has focused upon a structure in which each subframe includes one submap. The embodiments described hereinbelow are based on the structure shown in FIG. 7.

To reduce overhead for resource mapping indication signaling, a resource block (RB) of a constant size is defined and a method for indicating a data allocation region in units of an RB may be considered. A detailed description thereof will be described.

In summary, in a system using the frame structure shown in FIG. 7, it is assumed that a data burst is transmitted not in units of an entire frame but in units of a plurality of subframes within a frame. When transmitting data using a short subframe, a submap within each subframe may be used as resource mapping indication signaling. The location of the submap may be within a corresponding subframe or before a corresponding frame.

When transmitting a data burst using a short subframe, overhead generated to indicate the data burst can be reduced. Moreover, HARQ latency due to a large-size HARQ burst can be reduced.

Figure 8:
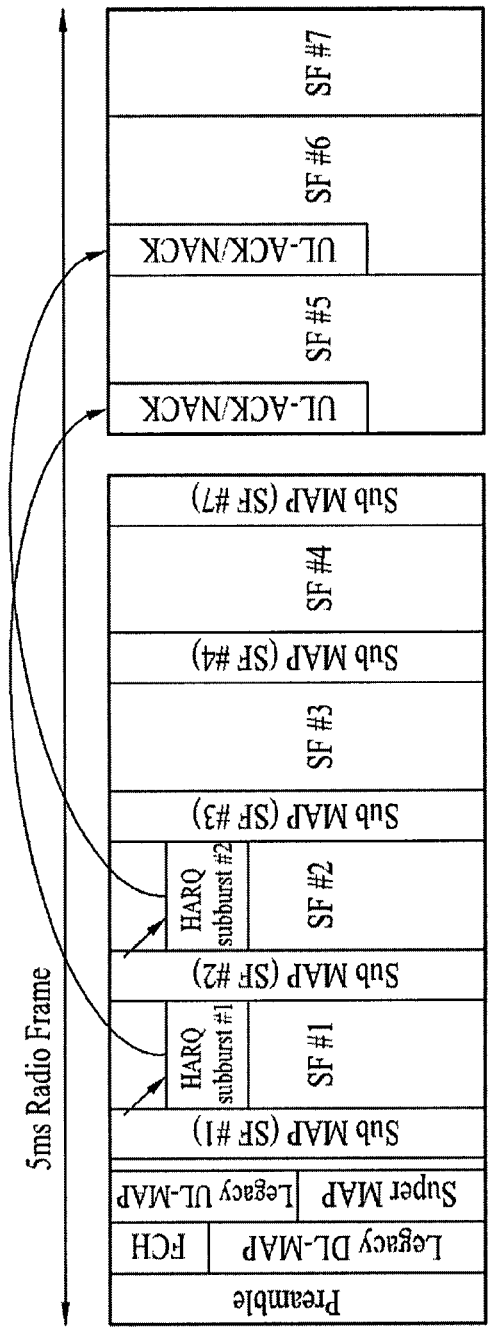
FIG. 8 is a view explaining a reduction in HARQ latency when generating and transmitting a burst in units of a subframe according to an exemplary embodiment of the present invention.

FIG. 8 is a view explaining a reduction in HARQ latency when generating and transmitting a burst in units of a subframe according to an exemplary embodiment of the present invention.

As illustrated in FIG. 8, an information block constructs a subburst in units of a subframe and is transmitted through each subframe. Then since ACK/NACK can be received within 5 ms for each subburst from a receiving stage, rapid reception of ACK/NACK can be achieved. Here, the subburst indicates one data unit transmitted to a user equipment having an arbitrary CID assuming that the subburst conforms to IEEE 802.16e. Namely, the subburst can be mapped to one data unit to which one CRC is attached.

However, the size of an information block received from an upper layer, for example, the size of a MAC PDU corresponding to one CID may be larger than the size of the subburst in units of a subframe. Then the large-size information block is transmitted through a plurality of subframes as will be described hereinbelow.

Figure 9:
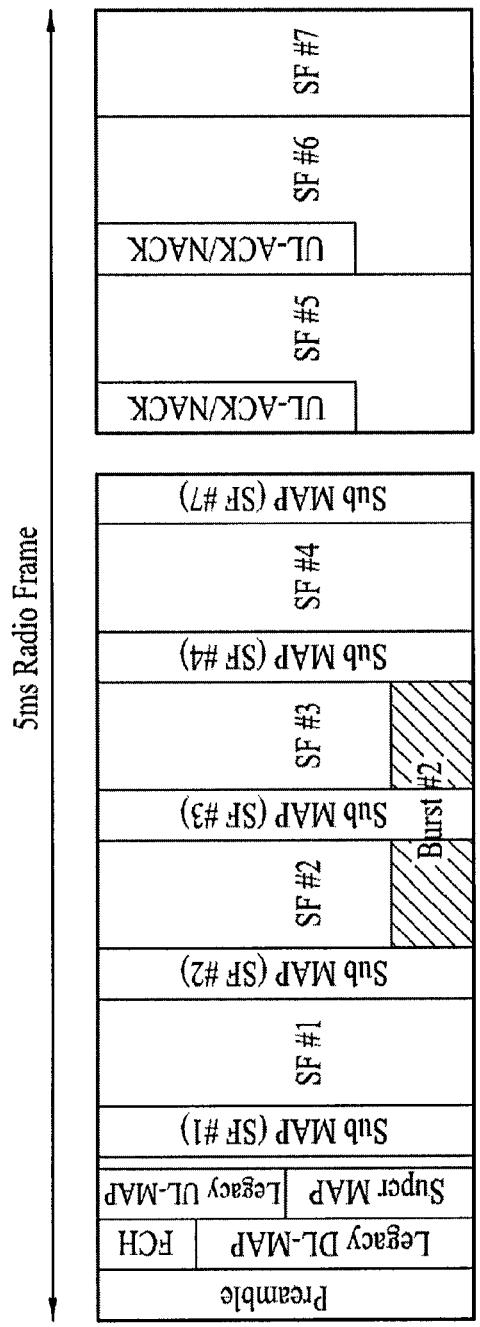
FIG. 9 is a view explaining transmission of a large-size information block through a plurality of subframes.

FIG. 9 is a view explaining transmission of a large-size information block through a plurality of subframes.

As illustrated in FIG. 9, the large-size information block may be transmitted through 2 or more subframes. To this end, the large-size information block is split into subframes. This split information blocks will be referred to as 'mini-subbursts' for convenience of description.

When mini-subbursts split by the information block are transmitted through 2 or more subframes, one mini-subburst being transmitted through one subframe, repetition of control information for the information block corresponding to the same CID may occur in a submap of each subframe. Therefore, when the information block corresponding to the same CID is transmitted through a plurality of subframes, control information for each information block is transmitted only through a submap of the first subframe among the plurality of subframes to reduce the above-described signaling overhead. When an information block corresponding to one CID is split into a plurality of mini-subbursts for transmission, an efficient resource mapping method is specified.

Meanwhile, when transmitting data as shown in FIG. 9, another problem may occur.

Figure 10:
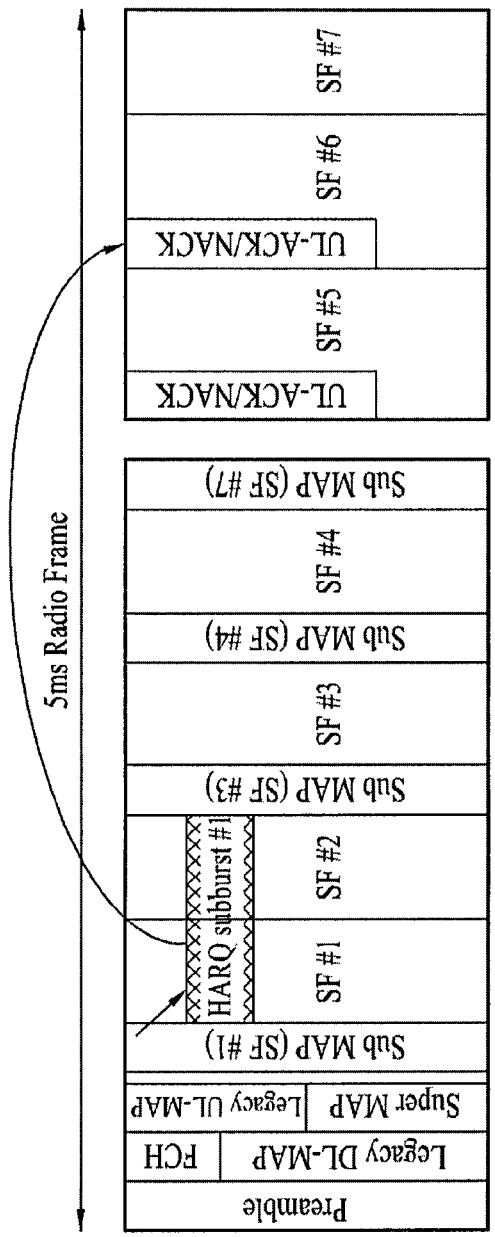
FIG. 10 is a view explaining a HARQ latency problem which may occur when an information block is transmitted through a plurality of subframes.

FIG. 10 is a view explaining a HARQ latency problem which may occur when an information block is transmitted through a plurality of subframes.

Namely, as illustrated in FIG. 10, when one HARQ subburst is transmitted over one control channel through 2 or more subframes, a receiving side can transmit ACK/NACK for a corresponding subburst only after one HARQ subburst is completely received. In more detail, since ACK/NACK is received from the receiving side only after the last subframe of two or more subframes used for transmission has been transmitted, additional HARQ latency may occur.

In the exemplary embodiment of the present invention, a multiple HARQ technique is proposed to solve the above-described additional HARQ latency problem. Namely, unlike setting a subburst to have one CRC, the subburst is divided into n mini-subbursts to attach multiple CRCs and a CRC is attached to each mini-subburst. The n mini-subbursts commonly have any CID and a HARQ process is separately operated due to an individual CRC. A transmitting side receives ACK/NACK for each mini-subburst and proposes retransmission in units of a mini-subburst.

Hereinafter, a description will be given of a method for reducing overhead of control information when a mini-subburst is transmitted in units of a plurality of subframes and a method for reducing HARQ latency through HARQ processing for each subburst.

First, when using a structure of a short subframe, direction for resource allocation information in a control channel is defined.

Figure 11:
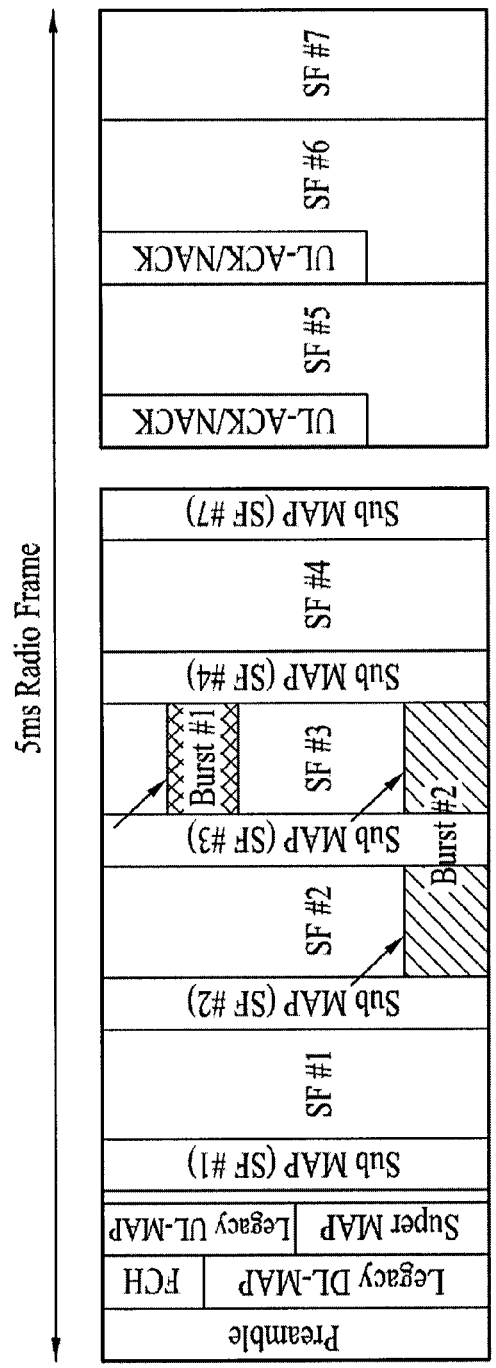
FIG. 11 is a view indicating a location of a data burst for each subframe.

FIG. 11 is a view indicating a location of a data burst for each subframe.

As illustrated in FIG. 11, control information for data (burst #2) over two subframes is transmitted in corresponding control channels (i.e., Sub MAP (SF#2) and Sub MAP (SF#3)) within respective subframes and therefore resource allocation information for data can be transmitted to a user equipment. However, such a method is inefficient because the same information (for example, CID, MCS level, etc.) for burst #2 is repeatedly transmitted in two control channels.

Figure 12:
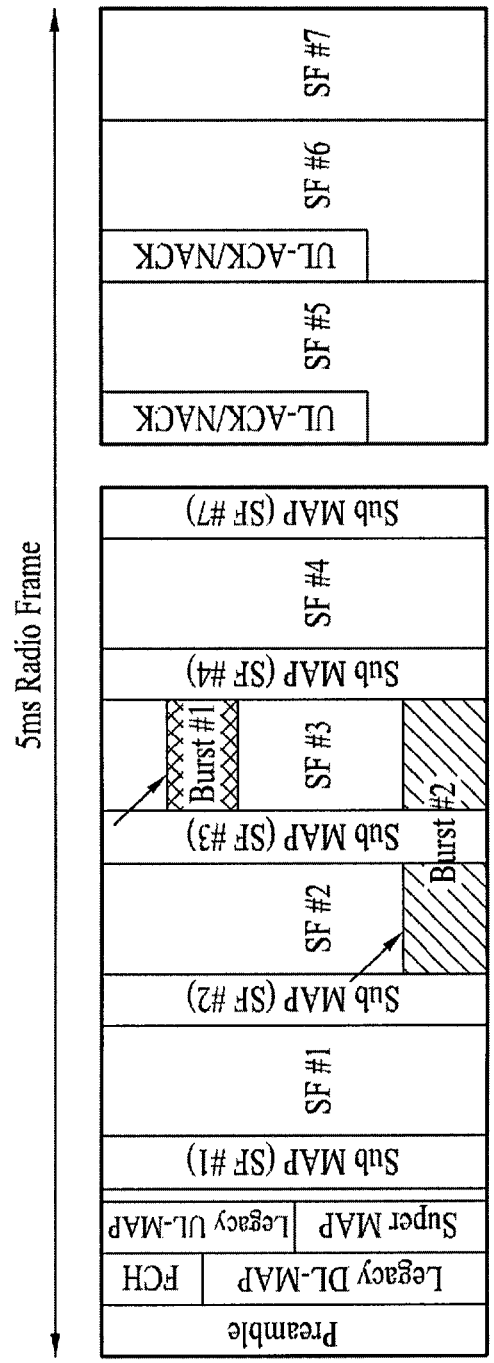
FIG. 12 and FIG. 13 illustrate examples of a method for reducing control overhead when an information block is transmitted through a plurality of subframes according to an exemplary embodiment of the present invention.
Figure 13:
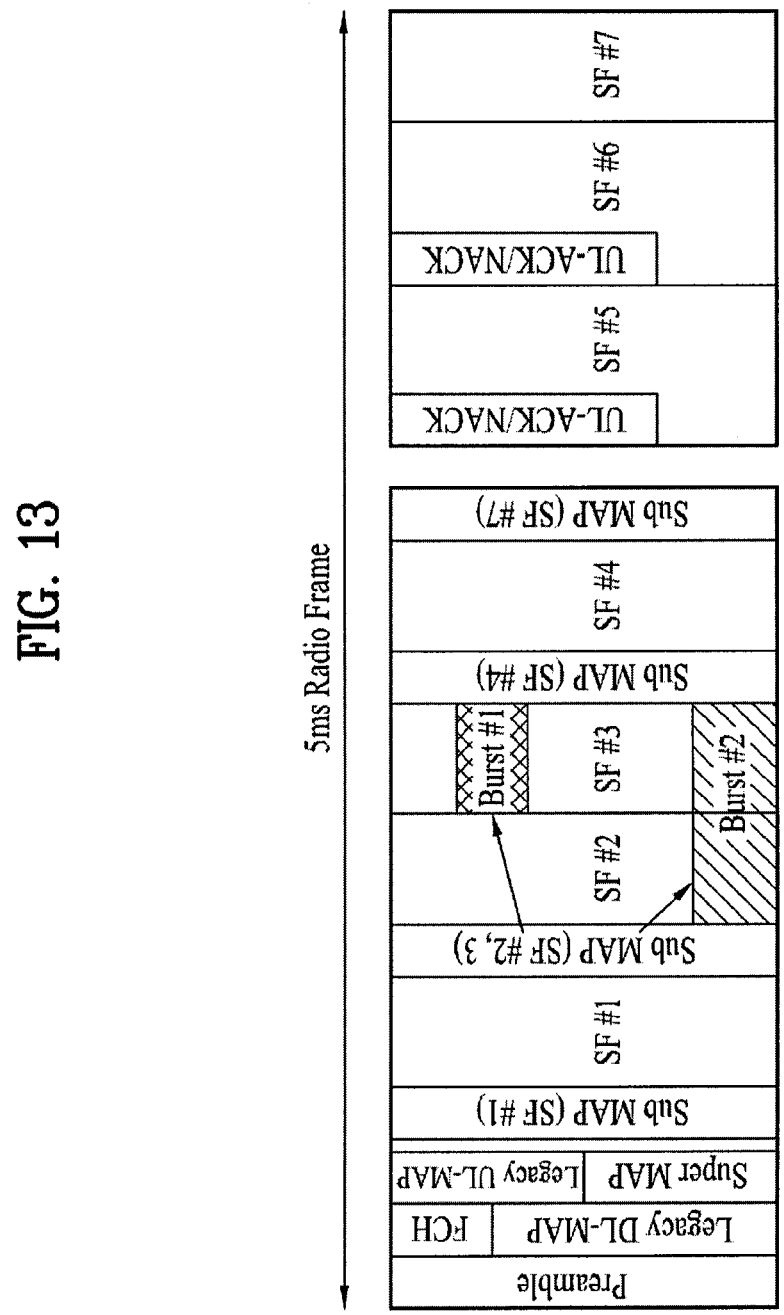

FIG. 12 and FIG. 13 illustrate examples of a method for reducing control overhead when an information block is transmitted through a plurality of subframes according to an exemplary embodiment of the present invention.

Specifically, in FIG. 12, when a large information bit is transmitted through a plurality of subframes, control information is indicated only in the first subframe and thus control overhead which may be generated in a subframe after the first subframe is reduced. That is, control signaling for a mini-subburst transmitted through subframe #3 is omitted and signaling for only a mini-subburst transmitted through subframe #2 is implemented.

FIG. 13 shows a method for controlling, in one control channel, information about data transmitted within a plurality of subframes by extending two subframes to one subframe and transmitting only one control channel using an increased TTI. Namely, subframe #2 and subframe #3 are integrated so that only one control channel is allocated, and burst #2 transmitted through subframe #2 and subframe #3 and burst #1 transmitted only through subframe #3 are all transmitted through Sub MAP (SF #2, 3).

In this exemplary embodiment, any one of the methods described with reference to FIG. 12 and FIG. 13 may be used. However, both methods are the same in that when an information block is transmitted through a plurality of subframes, control information is transmitted only through a control channel of the first subframe.

Meanwhile, in the exemplary embodiment of the present invention, if transmitted data is a HARQ subburst using HARQ, it is additionally proposed to transmit data attaching multiple CRCs using multiple HARQ processes to data transmitted to any user equipment. Namely, control information for a large-size data block transmitted through multiple TTIs in one control channel is transmitted just once and an individual CRC is attached to data transmitted in each subframe. Therefore, a delay caused by reception of ACK/NACK is reduced and only an error-generated mini-subburst is retransmitted, thereby improving overall system performance. A more detailed description thereof will be given hereinbelow.

In this exemplary embodiment, it is assumed that a short subframe (e.g., about 0.7 ms) is used and a submap is used for resource mapping indication signaling for each subframe. To reduce overhead generated in an entire control channel in a structure using a short subframe, it is proposed to allocate a burst in units of a resource block (RB) which is newly defined. To apply rapid ACK/NACK transmission, which is an advantage of a short subframe structure, to transmission of a large-size information block using multiple subframes, it is also proposed to use multiple HARQ processes to which multiple CRCs are attached. To this end, a method for distributing a resource of a subburst is defined.

Specifically, in this exemplary embodiment, it is proposed to implement signaling for an entire data block by one control channel and to additionally apply multiple CRCs when one data block is transmitted through multiple subframes, and a method for allocating resources therefor is defined.

Figure 14:
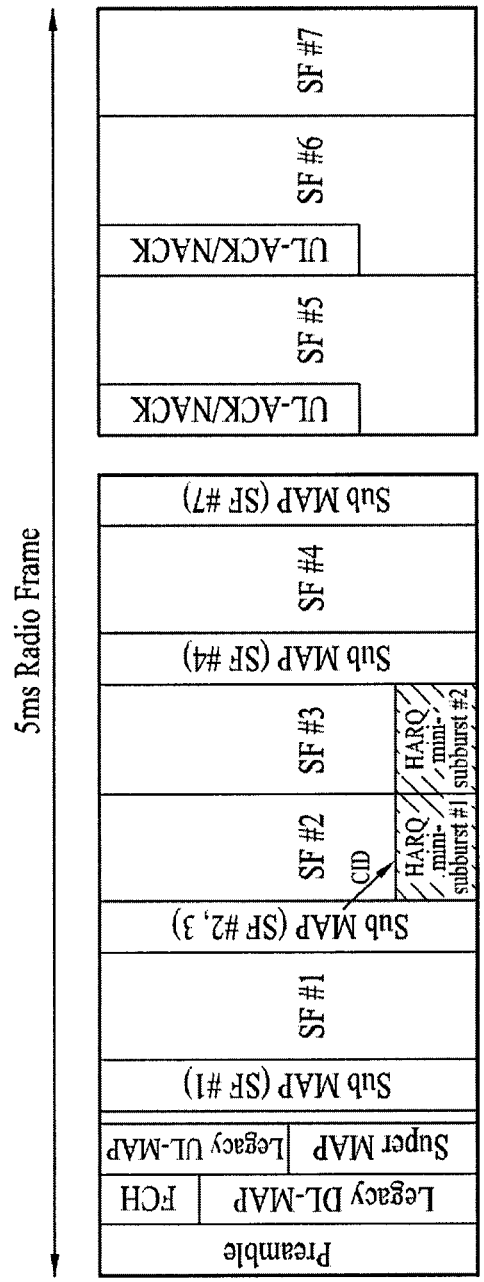
FIG. 14 is a view explaining advantages when a CRC is attached to each mini-subburst according to an exemplary embodiment of the present invention.

FIG. 14 is a view explaining advantages when a CRC is attached to each mini-subburst according to an exemplary embodiment of the present invention.

When any user equipment having any CID transmits a subburst to which one CRC is attached at multiple TTIs, an ACK/NACK delay for a corresponding subburst may occur. That is, since one HARQ subburst is transmitted over two subframes as shown in FIG. 14, if only one CRC is attached to one subburst, a receiving side can transmit ACK/NACK only after a subburst transmitted in subframe #2 and a subburst transmitted in subframe #3 are all received. Accordingly, if CRCs are attached to both the subburst transmitted in subframe #2 and the subburst transmitted in subframe #3, an ACK/NACK delay is prevented, and retransmission overhead for a small number of bit errors is reduced, which is an advantage when multiple CRCs are applied. Here, a unit divided to attach an individual CRC to an information bit corresponding to one CID is referred to as a mini-subburst. However, other terms may be used if they have the same meaning.

A method for distributing resources for multiple CRC attachment will now be described as an exemplary embodiment of the present invention.

As the most efficient method, a HARQ subburst may be divided into a plurality of mini-subbursts for transmission based on a subframe (i.e., time) to attach multiple CRCs. If resources are allocated and CRCs are attached to the mini-subbursts in such a way, ACK/NACK can be rapidly detected. For example, if CRCs are attached to mini-subbursts divided in units of a subframe, an ACK/NACK delay for data transmitted in subframe #2 shown in FIG. 14 is reduced and thus overall system performance is improved.

However, the method for distributing a subburst to attach multiple CRCs may be variously set in a frequency-time region in units of an RB as well as in a subframe, i.e., a time axis.

Figure 15:
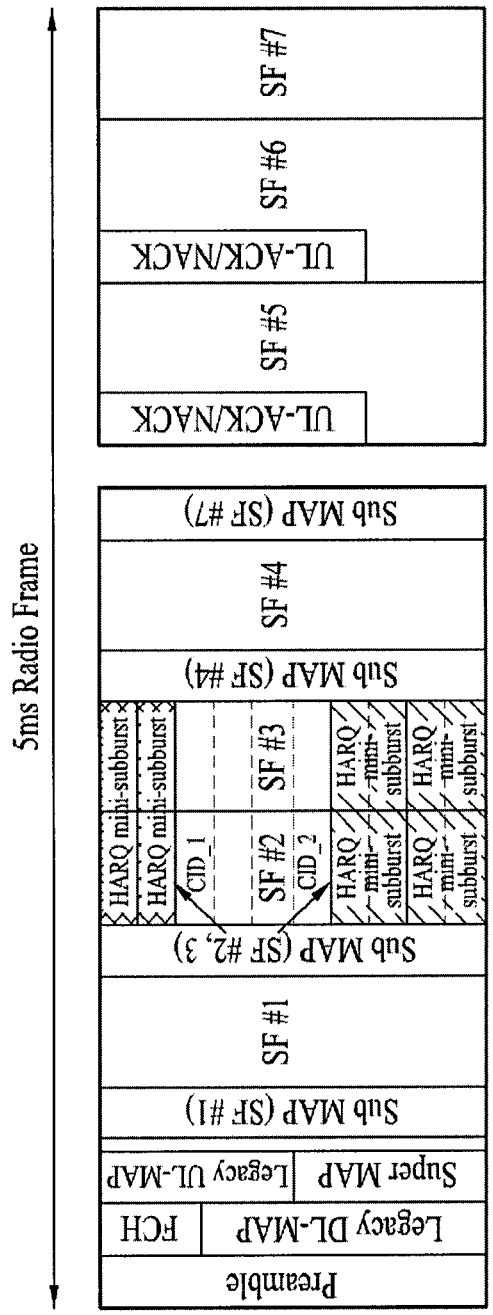
FIG. 15 is a view explaining a method for dividedly allocating a subburst in units of an RB according to an exemplary embodiment of the present invention.

FIG. 15 is a view explaining a method for dividedly allocating a subburst in units of an RB according to an exemplary embodiment of the present invention.

As illustrated in FIG. 15, if information about data (subbursts) transmitted in subframe #2 and subframe #3 is indicated only by one control channel, a multiple HARQ process can be applied by attaching multiple CRCs via various methods to data having an arbitrary CID. In FIG. 15, an area denoted by dotted lines is assumed to be one RB.

According to the exemplary embodiment shown in FIG. 15, one subburst is divided into a plurality of mini-subbursts and respective mini-subbursts are transmitted through two or more subframes, each mini-subburst being transmitted through one subframe. Moreover, respective mini-subbursts may be allocated to two or more RBs within one or more subframes in such a manner that one mini-subburst is allocated to one RB.

Specifically, although a subburst corresponding to CID_1 shown in FIG. 15 is allocated to two RBs in each HARQ mini-subburst, respective RBs are divided along a frequency axis. Then a rapid ACK/NACK detection effect is not achieved but retransmission overhead which may occur in retransmission for a small number of bit errors can be reduced.

In FIG. 15, a burst belonging to one CID_2 may be transmitted to RBs which are divided in a time-frequency region. This leads to a reduction in retransmission overhead as well as rapid ACK/NACK detection.

A method for allocating a resource region of a subburst corresponding to one CID will now be described based on the aforementioned description.

Figure 16:
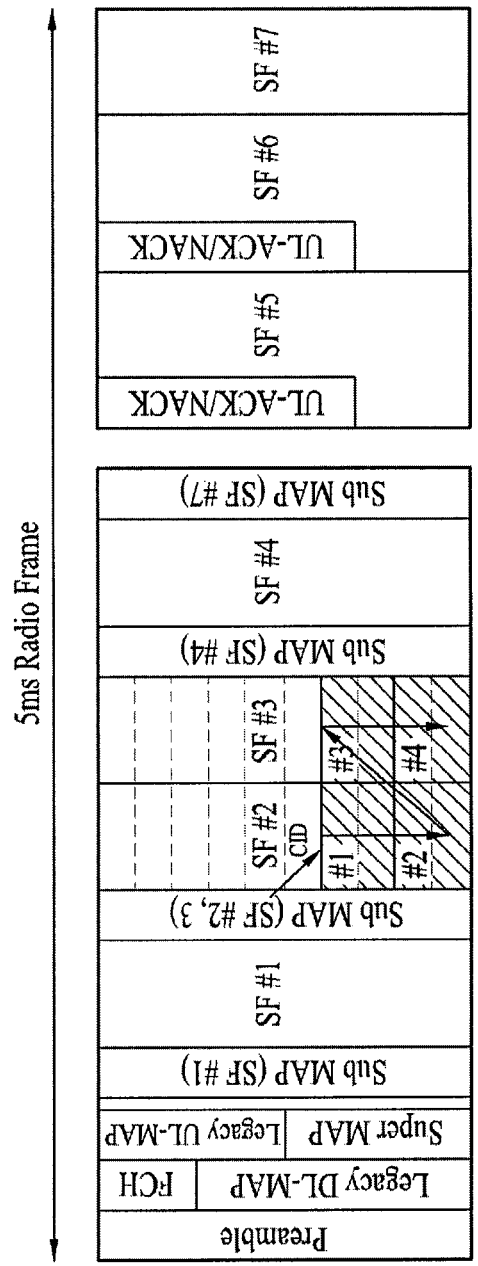
FIG. 16 and FIG. 17 are views illustrating methods for allocating a subburst corresponding to one CID to a resource region according to an exemplary embodiment of the present invention.
Figure 17:
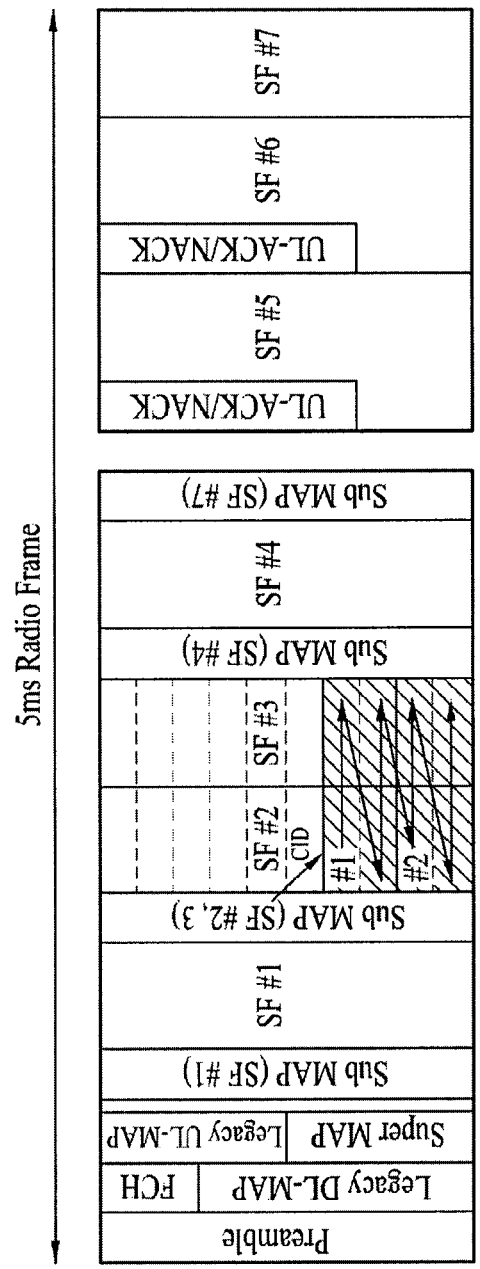

FIG. 16 and FIG. 17 are views illustrating methods for allocating a subburst corresponding to one CID to a resource region according to an exemplary embodiment of the present invention.

Specifically, a subburst corresponding to CID_1 shown in FIG. 15 may be interpreted as an application of a frequency-first mapping method in which a mini-subburst is allocated to an RB over a plurality of subframes in a specific frequency region and then a mini-subburst is continuously allocated to an RB in the next frequency region, as illustrated in FIG. 17.

Moreover, a subburst corresponding to CID_2 shown in FIG. 15 may be interpreted as an application of a time-first mapping method in which mini-subbursts are allocated to a plurality of RBs within a specific subframe and then mini-subbursts are continuously allocated to RBs in the next subframe, as illustrated in FIG. 16.

In addition to the case where one burst is transmitted through multiple TTIs in a structure of a short subframe, there may be the case where a subburst to which one CRC is attached to an information block having a size greater than a predetermined size is transmitted in one subframe.

Figure 18:
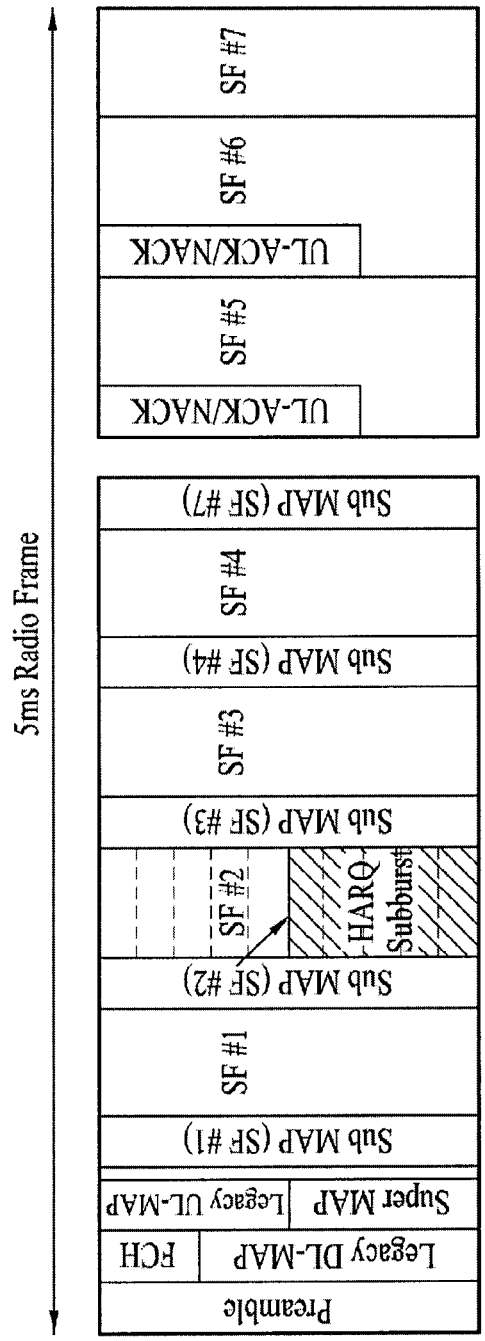
FIG. 18 is a view illustrating transmission of a large-size information block within one subframe.

FIG. 18 is a view illustrating transmission of a large-size information block within one subframe.

In this case, for a small number of bit errors generated in a large-size information block, a receiving side transmits a NACK signal for the entire information block and a transmitting side retransmits the information block.

The embodiments of the present invention can improve system performance through the foregoing multiple CRC attachment method even through an information block is not transmitted through a plurality of subframes.

Figure 19:
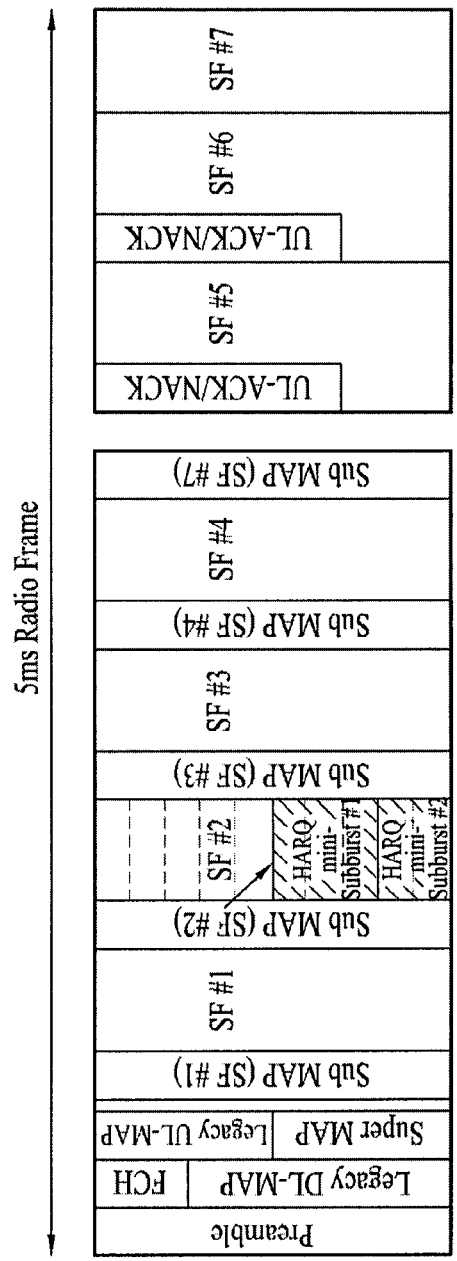
FIG. 19 is a view illustrating a method for applying multiple CRCs by allocating a plurality of mini-subbursts within one subframe according to an exemplary embodiment of the present invention.

FIG. 19 is a view illustrating a method for applying multiple CRCs by allocating a plurality of mini-subbursts within one subframe according to an exemplary embodiment of the present invention.

Namely, one subburst is divided into a plurality of mini-subbursts and a CRC is attached to each mini-subburst. The mini-subbursts may be allocated for transmission within one subframe as illustrated in FIG. 19. In FIG. 19, an allocation unit of one mini-subburst is an RB.

Meanwhile, the method of the above exemplary embodiment of the present invention will now be described according to roles performed in each layer of a transmitting side.

Figure 20:
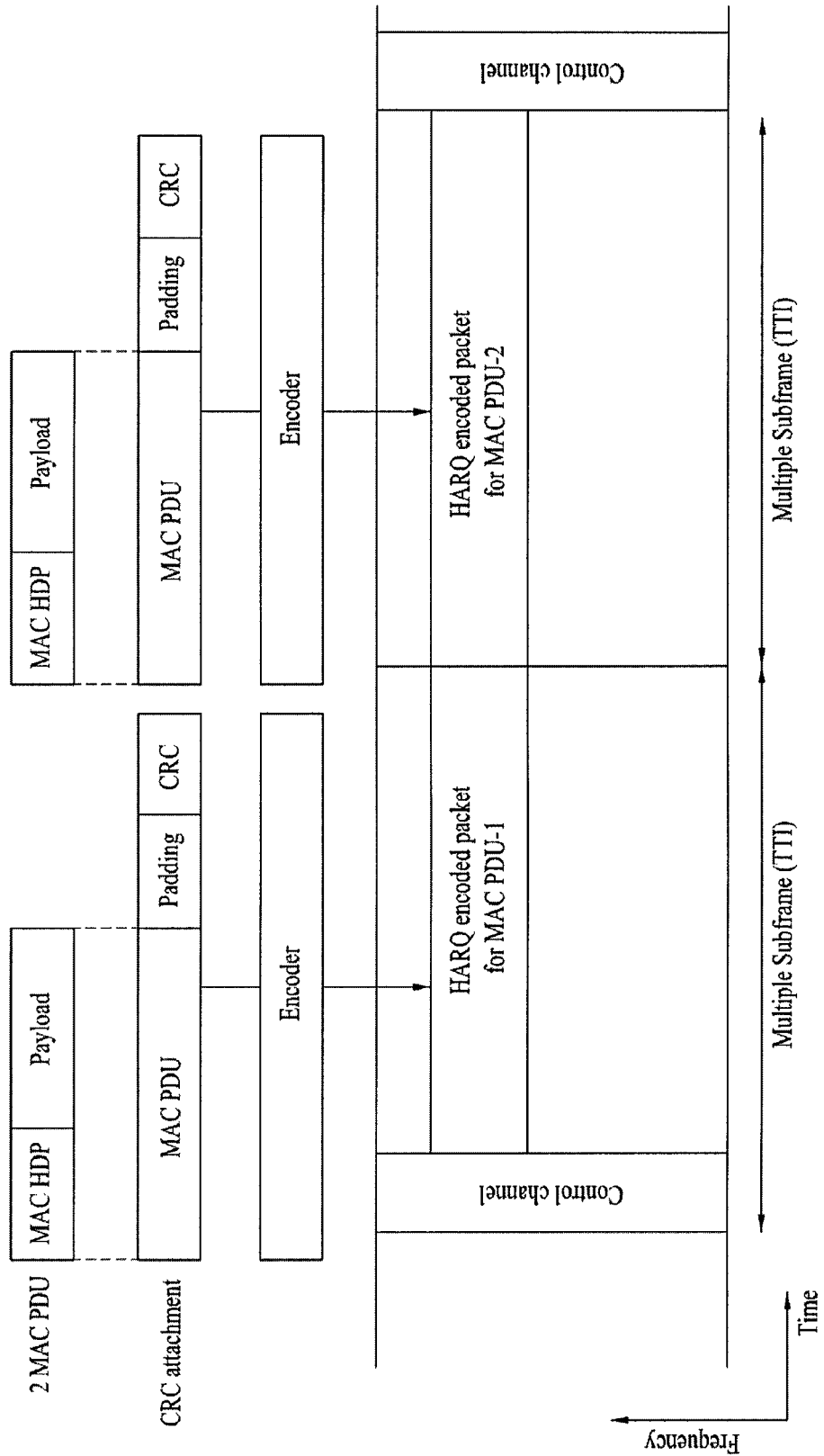
FIG. 20 is a view illustrating a method for generating and transmitting an existing MAC PDU.

FIG. 20 is a view illustrating a method for generating and transmitting an existing MAC PDU.

As illustrated in FIG. 20, in an existing mobile communication system, e.g., in IEEE 802.16e system, a MAC layer generates one PDU per subframe. Specifically, FIG. 20 shows transmission of 2 MAC PDUs through two subframes (TTIs). Accordingly, a MAC PDU transmitted through each subframe includes a MAC header which may increase MAC header overhead.

To generate the MAC PDU transmitted through each subframe, a MAC layer is necessary to receive various information from a physical layer and such L1-L2 interaction may increase complexity of implementation.

Figure 21:
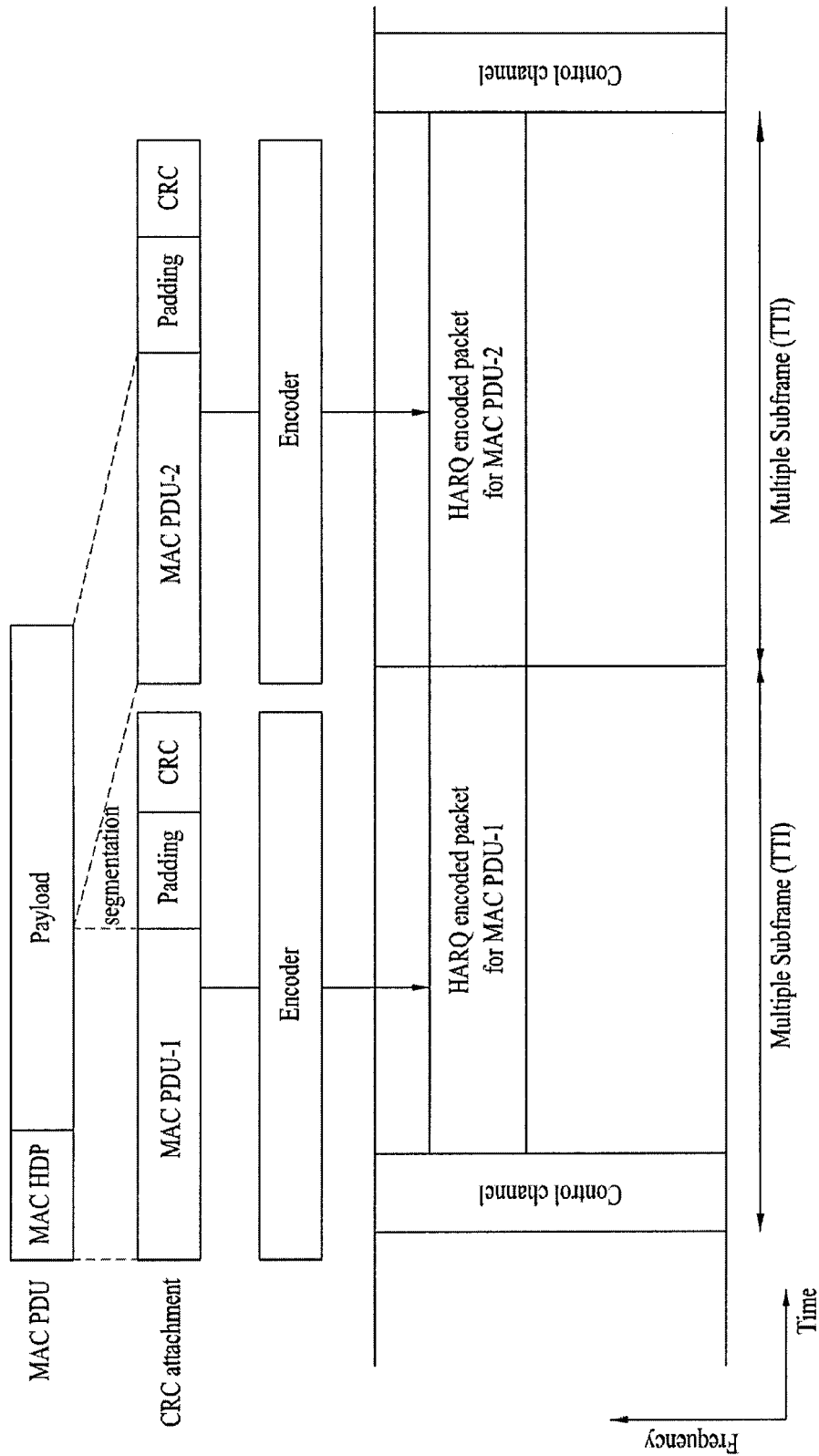
FIG. 21 is a view explaining a physical segmentation concept according to an exemplary embodiment of the present invention.

FIG. 21 is a view explaining a physical segmentation concept according to an exemplary embodiment of the present invention.

A physical layer shown in FIG. 21 splits one PDU generated from MAC based on a subframe size and inputs the split MAC PDU to an encoder at a time interval. The time interval is for transmitting the split MAC PDU every subframe. Since the split MAC PDU can be transmitted during a time interval, a plurality of split MAC PDUs can be transmitted only through one encoder set. Here, the 'encoder set' is assumed to be a combination of encoders which can generate channel coded information transmitted through one subframe.

Thus the encoded split MAC PDUs can be transmitted through two or more subframes, one encoded split MAC PDU being transmitted through one subframe. According to this exemplary embodiment, division of an information block is performed by a physical layer rather than a MAC layer. Therefore, the MAC layer does not need to generate the MAC PDU to be transmitted through one subframe. Further, the MAC layer does not need to perform the L1-L2 interaction. Since the MAC PDUs transmitted through a plurality of subframes have been split from one MAC PDU, only one MAC header is needed and therefore a MAC header overhead problem can be solved.

Segmentation of an information block performed in the physical layer will be referred to as 'PHY segmentation'.

A description will be given of a method for flexibly coping with a small number of bit errors in a multi-carrier support mode using a multiple HARQ scheme and/or a PHY segmentation scheme according to another exemplary embodiment of the present invention. To this end, the multi-carrier support mode will now be described in detail.

A future generation mobile communication system (e.g., a 3GPP LTE-Advanced system and an IEEE 802.16m system) controls, using one common MAC, a plurality of bandwidths in an existing system (a legacy system, e.g., a 3GPP LTE system for the 3GPP LTE-Advanced system, and an IEEE 802.16e system for the IEEE 802.16m system) to transmit one common MAC PDU through multiple bands or multiple carriers.

Figure 22:
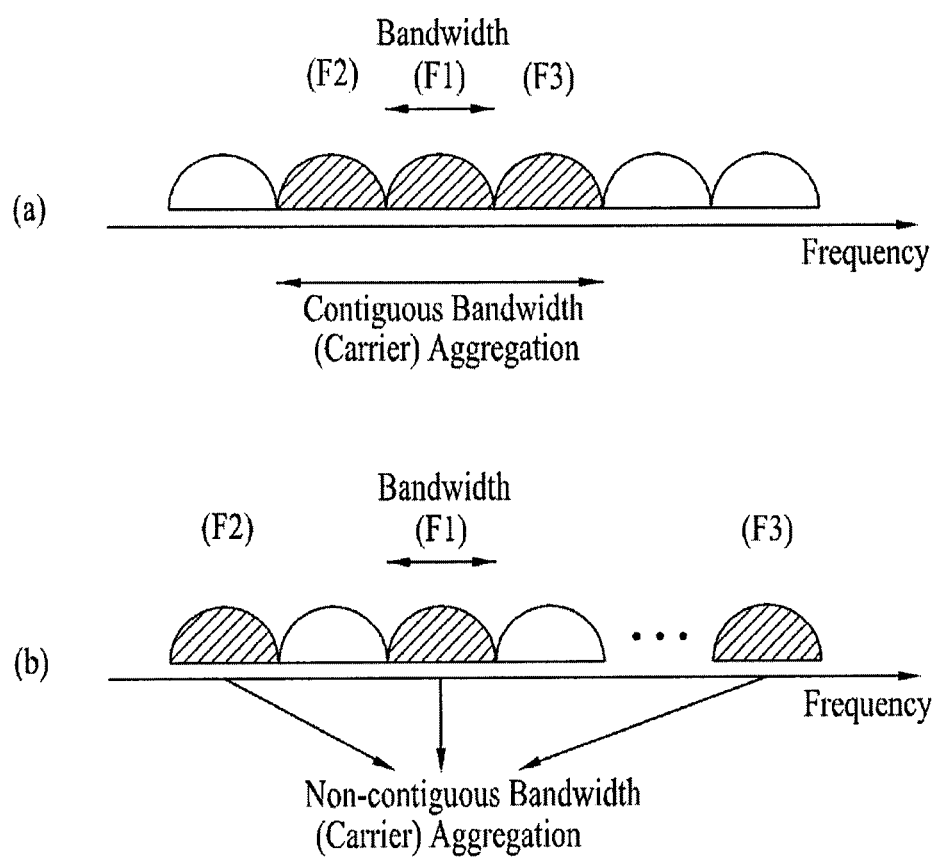
FIGS. 22A and 22B are views illustrating the concept of a multi-carrier set for a multi-carrier supporting operation.

FIGS. 22A and 22B are views illustrating the concept of a multi-carrier set for a multi-carrier supporting operation.

Specifically, FIG. 22A illustrates a method of supporting a multi-carrier mode by successively combining existing bandwidths, and FIG. 22B illustrates a method of supporting a multi-carrier mode by intermittently (or non-contiguously) combining existing bandwidths. In FIGS. 22A and 22B, it is assumed that one bandwidth F1, F2, or F3 denotes a bandwidth controlled by one carrier in a legacy system. Multi-bandwidth aggregation or multi-carrier aggregation is controlled by one common MAC.

Figure 23:
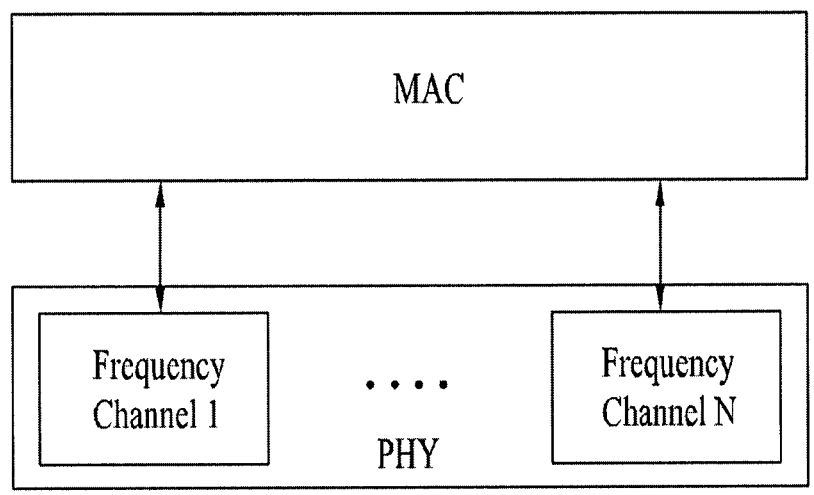
FIG. 23 is a view illustrating a structure of a multi-carrier support protocol.

FIG. 23 is a view illustrating a structure of a multi-carrier support protocol.

As illustrated in FIG. 23, carrier bands constituting respective frequency channels in a physical layer are controlled by one common MAC. A process of transmitting one MAC PDU through a multi-carrier support mode according to the protocol structure is as follows.

Figure 24:
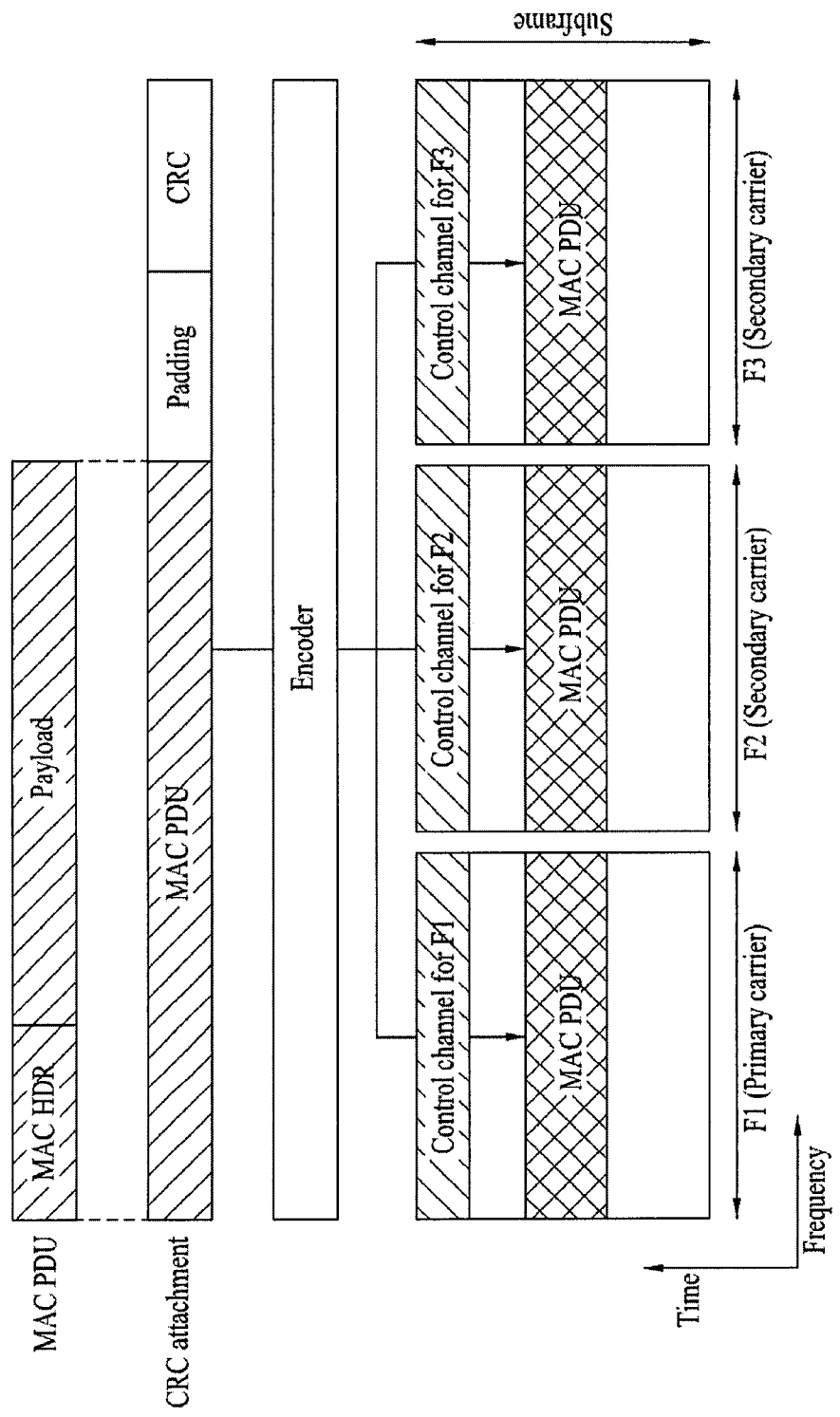
FIG. 24 is a view explaining a process of transmitting one MAC PDU through multiple carriers in a multi-carrier support mode.

FIG. 24 is a view explaining a process of transmitting one MAC PDU through multiple carriers in a multi-carrier support mode.

As described with reference to FIG. 23, a plurality of carrier bands is controlled by one common MAC in a multi-carrier mode and this means that one CRC is attached to one MAC PDU by the common MAC and the MAC PDU is transmitted through multiple carriers.

Specifically, it is assumed that three carrier bands F1, F2, and F3 are controlled by one common MAC. Although in FIG. 24 a primary carrier F1 is assumed as including information about secondary carriers F2 and F3, a method for constructing multiple carriers may be different.

One MAC PDU is processed by a common MAC which controls multiple carriers and in this case one CRC is attached to the MAC PDU. Thereafter the MAC PDU is input to an encoder and dividedly transmitted so that the MAC PDU can be transmitted through each of the carriers F1, F2, and F3.

When data is transmitted by attaching only one CRC to a MAC PDU of an increased size in a wide bandwidth up to a maximum of 100 MHz, an entire MAC PDU should be retransmitted in some cases due to a small number of bit errors.

To overcome such a problem, the exemplary embodiment of the present invention proposes an application of a multiple HARQ supporting method in a multi-carrier support mode is proposed.

Figure 25:
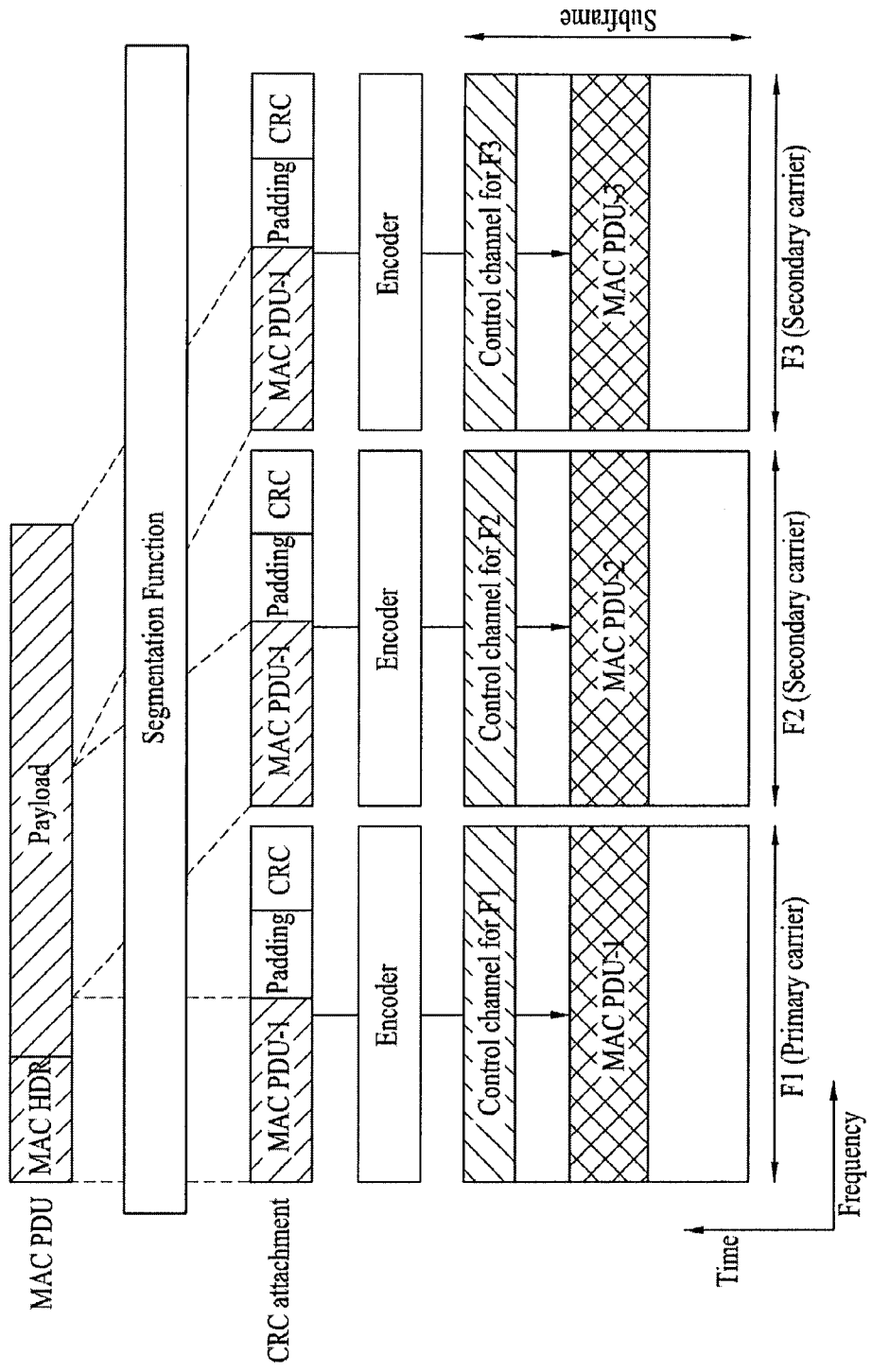
FIG. 25 is a view explaining a method for transmitting an information block by applying a multiple HARQ scheme in a multi-carrier support mode according to an exemplary embodiment of the present invention.

FIG. 25 is a view explaining a method for transmitting an information block by applying a multiple HARQ scheme in a multi-carrier support mode according to an exemplary embodiment of the present invention.

One MAC PDU transmitted by a common MAC is divided in a form which can be transmitted through each carrier and a CRC is attached to each of the divided MAC PDUs. Namely, if one MAC controls N carriers, one MAC PDU is split into N MAC PDUs and N CRCs are attached to the split MAC PDUs.

Although such a method generates a MAC PDU having one MAC header through a common MAC, it can be interpreted as attaching multiple CRCs to the split MAC PDUs by the PHY segmentation. When a CRC is attached to the split MAC PDU transmitted through each carrier, if an error occurs in a CRC-attached split MAC PDU, only an error-generated split MAC PDU is retransmitted. According to this exemplary embodiment, a HARQ process is implemented with respect to each CRC-attached data burst.

The above-described functions may be performed by, for example, a microprocessor, a controller, a microprocessor, or an application specific integrated circuit (ASIC), according to software or program code which is designed to carry out the functions. The design, development, and implementation of the code will be apparent to those skilled in the art based on the description of the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

The method according to the embodiment of present invention is applicable to an IEEE 802.16m system which is an improved model of an IEEE 802.16e system. However, the present invention is further applicable to any mobile communication system which uses a HARQ scheme and requires transmission of a large-size information block.

The invention claimed is:

1. A method for a user equipment (UE) operating in a wireless communication system, the method comprising:
   receiving a MAC PDU (Medium Access Control Protocol Data Unit) from a MAC (Medium Access Control) layer;
   splitting the MAC PDU based on a subframe size in a PHY (physical) layer, the PHY layer being a lower layer relative to the MAC layer, if the size of the MAC PDU is larger than the subframe size;
   generating a plurality of split MAC PDUs, wherein each split MAC PDU has a CRC (Cyclic Redundancy Check); and
   transmitting each of the plurality of split MAC PDUs through a different subframe.

2. The method according to the claim 1, further comprising:
   re-transmitting one of the plurality of split MAC PDUs corresponding to a NACK (Negative ACKnowledge) signal if the NACK signal is received.

3. The method according to the claim 1, wherein a subframe in which a split MAC PDU is transmitted has a control information region only if the split MAC PDU is an initial split MAC PDU of the plurality of split MAC PDUs.

4. The method according to the claim 1, wherein a subframe in which a split MAC PDU is transmitted has no control information region if the split MAC PDU is not an initial split MAC PDU of the plurality of split MAC PDUs.

5. An apparatus operating in a wireless communication system, the apparatus comprising:
   an RF (radio frequency) module; and
   a processor configured to control the RF module,
   wherein the processor is further configured to receive a MAC PDU (Medium Access Control Protocol Data Unit) from a MAC (Medium Access Control) layer, to split the MAC PDU based on a subframe size in a PHY (physical) layer, the PHY layer being a lower layer relative to the MAC layer, if a size of the MAC PDU is larger than the subframe size, to generate a plurality of split MAC PDUs, wherein each split MAC PDU has a CRC (Cyclic Redundancy Check), and to transmit each of the plurality of split MAC PDUs through a different subframe.

6. The apparatus according to the claim 5, wherein the processor is further configured to re-transmit one of the plurality of split MAC PDUs corresponding to a (Negative ACKnowledge) signal if the NACK signal is received.

7. The apparatus according to the claim 5, wherein a subframe in which a split MAC PDU is transmitted has a control information region only if the split MAC PDU is an initial split MAC PDU of the plurality of split MAC PDUs.

8. The apparatus according to the claim 5, wherein a subframe in which a split MAC PDU is transmitted has no control information region if the split MAC PDU is not an initial split MAC PDU of the plurality of split MAC PDUs.

* * * * *